(12) United States Patent
Broyde et al.

(10) Patent No.: US 7,932,741 B2
(45) Date of Patent: Apr. 26, 2011

(54) PSEUDO-DIFFERENTIAL INTERFACING DEVICE HAVING A TERMINATION CIRCUIT

(75) Inventors: Frédéric Broyde, Maule (FR); Evelyne Clavelier, Maule (FR)

(73) Assignee: Excem SAS, Maule (FR)

( * ) Notice: Subject to any disclaimer, the term of this patent is extended or adjusted under 35 U.S.C. 154(b) by 0 days.

(21) Appl. No.: 12/598,357

(22) PCT Filed: May 8, 2008

(86) PCT No.: PCT/IB2008/051826
§ 371 (c)(1),
(2), (4) Date: Oct. 30, 2009

(87) PCT Pub. No.: WO2008/155676
PCT Pub. Date: Dec. 24, 2008

(65) Prior Publication Data
US 2010/0124295 A1  May 20, 2010

(30) Foreign Application Priority Data
Jun. 21, 2007 (FR) .................................. 07 04421

(51) Int. Cl.
*H03K 17/16* (2006.01)
*H03K 19/003* (2006.01)
(52) U.S. Cl. .............................. 326/30; 326/32; 326/33
(58) Field of Classification Search .................... 326/30, 326/32–34
See application file for complete search history.

(56) References Cited

U.S. PATENT DOCUMENTS

| | | | |
|---|---|---|---|
| 5,381,034 A * | 1/1995 | Thrower et al. | 257/529 |
| 6,195,305 B1 | 2/2001 | Fujisawa et al. | |
| 6,304,098 B1 | 10/2001 | Drost et al. | |
| 6,812,734 B1 | 11/2004 | Shumarayev et al. | |
| 7,403,040 B2 * | 7/2008 | Park et al. | 326/86 |
| 2005/0253622 A1 * | 11/2005 | Dreps et al. | 326/31 |
| 2006/0267633 A1 | 11/2006 | King | |
| 2007/0117446 A1 | 5/2007 | Broyde et al. | |

FOREIGN PATENT DOCUMENTS

| | | |
|---|---|---|
| EP | 0531630 A | 3/1993 |
| FR | 2849728 A1 | 7/2004 |

OTHER PUBLICATIONS

International Search Report for International Application No. PCT/IB2008/051826, dated Oct. 20, 2008.

Kudoh J et al: "A CMOS Gate Array With Dynamic-Termination GTL I/O Circuits" International Conference on Computer Design: VLSI in Computers and Processors. Austin, Oct. 2-4, 1995, New York, IEEE, US, Oct. 2, 1995, pp. 25-29, XP000631889; ISBN: 0-7803-3124-9; the whole document.

* cited by examiner

*Primary Examiner* — Anh Q Tran
(74) *Attorney, Agent, or Firm* — Barnes & Thornburg LLP

(57) ABSTRACT

The invention relates to an interfacing device for pseudo-differential transmission through interconnections used for sending a plurality of electrical signals. The interfacing device of the invention includes signal terminals and a common terminal distinct from the reference terminal (ground). A transmitting circuit receiving the input signals of the transmitting circuit coming from a source delivers, when the transmitting circuit is in the activated state, currents to the signal terminals. A receiving circuit delivers, when the receiving circuit is in the activated state, output signals of the receiving circuit determined each by the voltage between one of the signal terminals and the common terminal, to the destination. A termination circuit is such that, when it is in the activated state, it is approximately equivalent, for the signal terminals and the common terminal, to a network consisting of 4 branches, each branch being connected to the common terminal and to one of the signal terminals.

19 Claims, 10 Drawing Sheets

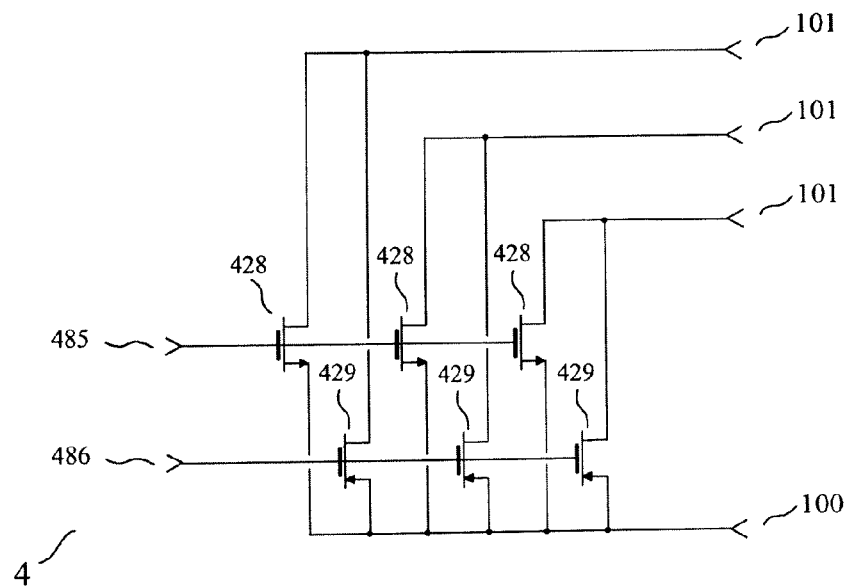
FIG. 11
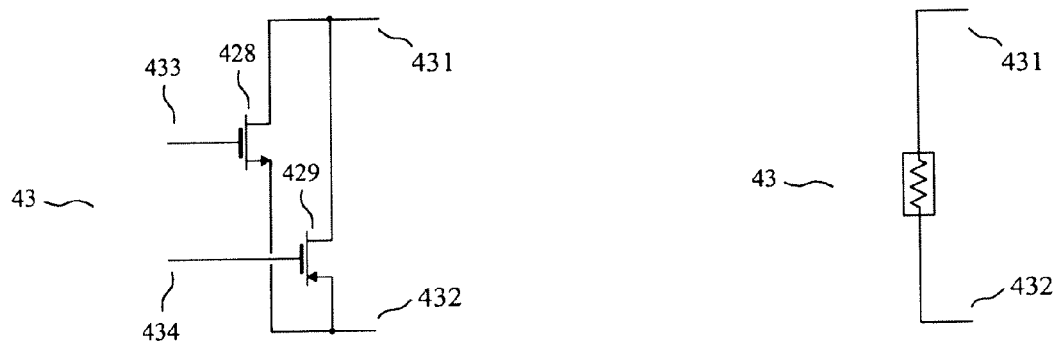
FIG. 12
FIG. 13

US 7,932,741 B2

PSEUDO-DIFFERENTIAL INTERFACING DEVICE HAVING A TERMINATION CIRCUIT

CROSS-REFERENCE TO RELATED APPLICATIONS

The present application claims the benefit of priority to International Patent Application No. PCT/IB2008/051826 filed 8 May 2008, which further claims the benefit of priority to France Patent Application No. 0704421 filed 21 Jun. 2007, the contents of which are incorporated herein by reference in their entirety.

FIELD OF THE INVENTION

The invention relates to an interfacing device for pseudo-differential transmission through interconnections used for sending a plurality of electrical signals, such as the interconnections made with multiconductor cables, or with the traces of a printed circuit board, or inside an integrated circuit.

The French patent application Ser. No. 07/04421 of 21 Jun. 2007, entitled "Dispositif d'interface pseudo-différentiel avec circuit de terminaison" is incorporated by reference.

PRIOR ART

Let us consider the problem of transmission through an interconnection, for obtaining m transmission channels, m being an integer greater than or equal to 2. Each transmission channel may be used for transmitting signals of any type, for instance analog signals or digital signals, from a source to a destination. We consider here that a digital signal is a signal whose value is defined only at discrete points in time, the set of the values that the signal may take on being discrete. We consider also that each value of a digital signal corresponds to a voltage or current interval. This definition of a digital signal as a "digital signal defined by voltage or current intervals" includes:

the binary signals used in binary signaling, that is to say any signal such that, in each transmission channel, the set of the values that this signal may take on has 2 elements;

the N-ary signals (N being an integer greater than or equal to 3) used in multilevel signaling, that is to say any signal such that, in each transmission channel, the set of the values that this signal may take on has N elements.

Binary signals are the signals which are the most frequently used today by digital integrated circuits, for instance the integrated circuits of the HCMOS family, which is well known to specialists. Multilevel signals, for instance quaternary signals (sometimes referred to as PAM-4 or 4-PAM), are used to obtain high bit rates. The use of such multilevel signals is for instance discussed in the article of J. L. Zerbe et al entitled "1.6 Gb/s/pin 4-PAM Signaling and Circuits for a Multidrop Bus", published in the *IEEE Journal of Solid-State Circuits*, vol. 36, No. 5, in May 2001.

We will consider that any signal which does not comply with this definition of a digital signal is an analog signal. Consequently, the result of any type of modulation of a carrier by a digital signal will be regarded as an analog signal.

The simplest transmission scheme for obtaining m transmission channels uses m single-ended links. Using m single-ended links, each transmission channel uses one transmission conductor of the interconnection, and the reference conductor (ground) is used for the return current produced by the currents flowing on the m transmission conductors. This scheme is vulnerable to the noise produced by some electromagnetic couplings between some conductors of said interconnection and other nearby conductors, for instance when said interconnection and these other conductors are built on the same printed circuit board.

However, there are transmission schemes intended to provide a good protection against the noise produced by unwanted electromagnetic couplings: differential links (see for instance the book of H. W. Johnson and M. Graham entitled *High-speed digital design: a handbook of black magic*, published by Prentice Hall PTR in 1993), and pseudo-differential links (see for instance the section II of the paper of A. Carusone, K. Farzan and D. A. Johns entitled "Differential signaling with a reduced number of signal paths" published in *IEEE Trans. Circuits Syst. II*, vol. 48, No. 3, pp. 294-300 in March 2001 and the section 4.2.3 of the book of F. Yuan entitled *CMOS current-mode circuits for data communications*, published by Springer in 2007).

A differential system for transmission providing m transmission channels uses an interconnection having 2m transmission conductors. A pseudo-differential system for transmission providing m transmission channels uses an interconnection having m transmission conductors and a common conductor distinct from the reference conductor (ground).

Interfacing devices for pseudo-differential transmission are for instance described in the U.S. Pat. No. 5,818,261 entitled "Pseudo-differential bus driver/receiver for field programmable devices", in the U.S. Pat. No. 5,994,925 entitled "Pseudo-differential logic receiver", in the U.S. Pat. No. 6,195,395 entitled "Multi-agent pseudo-differential signaling scheme" and in the U.S. Pat. No. 7,099,395 entitled "Reducing coupled noise in pseudo-differential signaling".

It should be noted that the wording "pseudo-differential" is also applied to devices which are not related in any way to pseudo-differential transmission. For instance, the patent application number US 2006/0267633 of the United States of America entitled "Pseudo-differential output driver with high immunity to noise and jitter" relates to a device having one differential input channel and one single-ended output channel: this device is not related to pseudo-differential transmission in any way. For instance, the U.S. Pat. No. 5,638,322 entitled "Apparatus and method for improving common mode noise rejection in pseudo-differential sense amplifiers" relates to sense amplifiers which to some extent look like conventional differential amplifiers: this invention is not related to pseudo-differential transmission in any way.

Two pseudo-differential systems for transmission each providing m=4 transmission channels are shown in FIG. 1 and in FIG. 2, these systems each comprising:

an interconnection (1) having m=4 transmission conductors (11) (12) (13) (14) plus a common conductor (10) distinct from the reference conductor (7);

a transmitting circuit (5) receiving at its input the signals of the 4 channels of the source (2);

a receiving circuit (6) having its output connected to the destination (3).

The transmitting circuit (5) receives at its input the signals of the 4 channels of the source (2), and its 5 output terminals are connected to the m+1=5 conductors of the interconnection (1), one of these conductors being the common conductor (10). The receiving circuit (6) has its 5 input terminals connected to the conductors of the interconnection (1), one of these conductors being the common conductor (10). The receiving circuit (6) produces voltages at its output terminals connected to the destination (3), each of these voltages being determined by one and only one of the voltages between one of the transmission conductors and the common conductor. The systems shown in FIGS. 1 and 2 provide 4 transmission channels, such that the signals of the 4 channels of a source (2) are sent to the 4 channels of the destination (3).

In the FIGS. 1 and 2, we find a termination (4), as in said U.S. Pat. No. 6,195,395. In the case of FIG. 1, the termination (4) is made of m=4 resistors (401) (402) (403) (404) each connected between a transmission conductor and ground. In the case of FIG. 2, the termination (4) is made of m+1=5 resistors, m=4 resistors (401) (402) (403) (404) being connected as in FIG. 1, and a resistor (410) being connected between the common conductor (10) and the reference conductor (7).

In FIGS. 1 and 2, instead of being connected to ground, the resistors of the termination (4) could be connected to a node intended to present a fixed voltage with respect to ground, for instance a power supply voltage. This technique is for instance used in the pseudo-differential signaling scheme using integrated circuits of the Gunning Transceiver Logic (GTL) family, which is well known to specialists. Each resistor connected to a conductor of the interconnection (1) could also be replaced with another known type of termination (see for instance the chapter 6 of the above-mentioned book of H. W. Johnson and M. Graham), for instance a split termination (also referred to as "Thevenin termination") comprising 2 resistors, the first resistor being inserted between this conductor of the interconnection and ground, the second resistor being inserted between this conductor of the interconnection and a node presenting a fixed voltage with respect to ground.

As explained in said U.S. Pat. No. 5,818,261, U.S. Pat. No. 5,994,925, U.S. Pat. No. 6,195,395 and U.S. Pat. No. 7,099,395, the common conductor is mainly used to provide a fixed reference voltage and is not used for the transmission of signals in said m transmission channels.

Consequently, when the transmitting circuit sends signals, the currents injected in the transmission conductors are associated with return currents flowing mainly in the reference conductor or in a power supply conductor. The specialist understands that this situation often creates unwanted couplings with other electronic circuits near the interconnection.

Consequently, the specialists in electromagnetic compatibility understand that prior art pseudo-differential systems for transmission generate electromagnetic disturbances which may degrade the performances of nearby circuits, and are vulnerable to electromagnetic disturbances produced by nearby circuits.

The specialists understand that the terminations (4) of FIGS. 1 and 2 are used for reducing reflections, and that such terminations produce return currents flowing mainly in the reference conductor or in a power supply conductor. Consequently, these terminations increase the generation of electromagnetic disturbances which may degrade the performances of nearby circuits, and the vulnerability to electromagnetic disturbances produced by nearby circuits.

DESCRIPTION OF THE INVENTION

It is an object of the interfacing device of the invention to provide pseudo-differential transmission through an interconnection having two or more transmission conductors, the transmission presenting reduced reflections and reduced unwanted couplings.

The invention is about a device for transmitting signals through a plurality of transmission channels, in a known frequency band, comprising:

m signal terminals, a common terminal and a reference terminal (ground), the signal terminals and the common terminal being intended to be connected to an interconnection having at least m+1 conductors, m being an integer greater than or equal to 2, said common terminal being not connected to said reference terminal;

a receiving circuit delivering, when the receiving circuit is in the activated state, p "output signals of the receiving circuit" corresponding each to a transmission channel, p being an integer greater than or equal to 2 and less than or equal to m, the input of the receiving circuit being coupled to at least p of said signal terminals and to said common terminal, each of said "output signals of the receiving circuit" being mainly determined by the voltage between one of said signal terminals and said common terminal; and a termination circuit coupled to each of said signal terminals and to said common terminal, the termination circuit being, when the termination circuit is in the activated state, approximately equivalent, for said signal terminals and said common terminal, to a network consisting of m branches, each of said branches having a first terminal and a second terminal, each of said branches consisting of a passive two-terminal circuit element connected in series with a voltage source delivering a constant voltage, the first terminal of each of said branches being connected to one and only one of said signal terminals, the second terminal of each of said branches being connected to said common terminal, each of said signal terminals being connected to said first terminal of one and only one of said branches.

According to the invention, the common terminal is not connected to the reference terminal, in agreement with the principle of pseudo-differential transmission. According to the invention, said receiving circuit delivers "output signals of the receiving circuit" corresponding each to a transmission channel, when the receiving circuit is in the activated state. According to the invention, it is possible that there is a deactivated state of the receiving circuit, in which the behavior of the receiving circuit is different. However, the existence of a deactivated state of the receiving circuit is not at all a characteristic of the invention.

According to the invention, said two-terminal circuit elements used in the equivalent network defined for modeling the termination circuit are passive two-terminal circuit elements, in the meaning of circuit theory (a passive circuit element is a circuit element in which the energy absorbed can only be positive or zero), but these two-terminal circuit elements are not necessarily linear.

According to the invention, the termination circuit in the activated state behaves approximately, for said signal terminals and said common terminal, as a network comprising passive two-terminal circuit elements having each a terminal held at a fixed voltage with respect to said common terminal. Said voltage may be positive, negative or zero. Said voltage may be the same for all said terminals held at a fixed voltage. Conversely, said voltage may be different for two or more of said terminals held at a fixed voltage.

According to the invention, the termination circuit in the activated state may be such that, at least one quiescent operating point, each of said passive two-terminal circuit elements has a small-signal impedance (also referred to as dynamic impedance) having, in at least a part of said known frequency band, an absolute value less than or equal to thousand ohms and a real part greater than or equal to three ohms and greater than or equal to one tenth of said absolute value. The set of the dynamic impedances defined by these inequalities has the three following properties:

experience shows that it contains the impedance values capable of effectively reducing the reflections of signals propagating through typical interconnections;

it contains the real impedances of the interval [3Ω, 1000Ω], which may be obtained with a resistor;

it does not contain impedances which may fortuitously appear (for instance because of stray capacitances) between a signal terminal and the reference terminal of a prior art pseudo-differential receiver, at an operating frequency.

The above-defined condition on small-signal impedances should be applicable to the normal operation of the device of the invention. Said quiescent operating point chosen for determining the small-signal impedances should therefore be such that the quiescent voltages between each of said signal terminals and said common terminal have values which may appear at a given point in time under normal operation. The lowest reflections are often obtained when said real part of the small-signal impedance ranges between 10Ω and 300Ω.

According to the invention, the termination circuit may comprise a TC terminal connected to said common terminal, m TS terminals each connected to one of said signal terminals, each of said signal terminals being connected to a different TS terminal, and may be such that, when the termination circuit is in the activated state:

the voltage between any one of said TS terminals and said TC terminal approximates the sum of a constant voltage and of the voltage, determined using the active sign convention, which would appear across a passive two-terminal circuit element through which the current flowing out of said TS terminal would flow;

the current flowing out of said TC terminal approximates the opposite of the sum of the currents flowing out of said m TS terminals.

According to the invention, it is possible that there is a deactivated state of the termination circuit, in which the behavior of the termination circuit is different from the one defined above. However, the existence of a deactivated state of the termination circuit is not at all a characteristic of the invention. The characteristics specified for the activated state of the termination circuit are, as explained below, particularly relevant when the device of the invention receives signals coming from said interconnection. Consequently, a device of the invention may be such that said termination circuit is in the activated state when said receiving circuit is in the activated state.

The specialist sees that, for the prior art pseudo-differential system for transmission shown in FIG. 1:

the termination (4) does not have an impedance matrix with respect to the common terminal;

the termination (4) has an impedance matrix $Z_{G1}$ with respect to the reference terminal.

The impedance matrix $Z_{G1}$ is a diagonal matrix of size 4×4 equal to $$Z_{G1} = \begin{pmatrix} R_1 & 0 & 0 & 0 \\ 0 & R_2 & 0 & 0 \\ 0 & 0 & R_3 & 0 \\ 0 & 0 & 0 & R_4 \end{pmatrix} \quad (1)$$

where we have used the notations of FIG. 1 and a suitable numbering of the signal terminals.

The specialist sees that, for the prior art pseudo-differential system for transmission shown in FIG. 2:

the termination (4) has an impedance matrix $Z_{C2}$ with respect to the common terminal;

the termination (4) has an impedance matrix $Z_{G2}$ with respect to the reference terminal.

The impedance matrices $Z_{C2}$ and $Z_{G2}$ are square matrices of size 5×5 equal to $$Z_{C2} = \begin{pmatrix} R_1+R_D & R_D & R_D & R_D & R_D \\ R_D & R_2+R_D & R_D & R_D & R_D \\ R_D & R_D & R_3+R_D & R_D & R_D \\ R_D & R_D & R_D & R_4+R_D & R_D \\ R_D & R_D & R_D & R_D & R_D \end{pmatrix} \quad (2)$$

and $$Z_{G2} = \begin{pmatrix} R_1 & 0 & 0 & 0 & 0 \\ 0 & R_2 & 0 & 0 & 0 \\ 0 & 0 & R_3 & 0 & 0 \\ 0 & 0 & 0 & R_4 & 0 \\ 0 & 0 & 0 & 0 & R_D \end{pmatrix} \quad (3)$$

where we have used the notations of FIG. 2 and a suitable numbering of the signal terminals and of the common terminal. The impedance matrix $Z_{G2}$ with respect to the reference terminal is diagonal whereas the impedance matrix $Z_{C2}$ with respect to the common terminal is not a diagonal matrix, since a pseudo-differential system for transmission requires $R_D \neq 0$.

A device of the invention may be such that said passive two-terminal circuit elements may be considered as linear. Consequently, according to the invention, said termination circuit in the activated state may, for said signal terminals and said common terminal, be approximately equivalent to a network comprising m passive linear two-terminal circuit elements, each passive linear two-terminal circuit element having a first terminal connected to one and only one of said signal terminals, each passive linear two-terminal circuit element having a second terminal connected to a node having a fixed voltage with respect to said common terminal, each of said signal terminals being connected to said first terminal of one and only one of said passive linear two-terminal circuit elements. Such a termination circuit in the activated state presents, with respect to said common terminal, at any frequency, a diagonal impedance matrix of size m×m. This characteristic does not apply to prior art terminations for which, at any given frequency:

it is not possible to define an impedance matrix with respect to the common terminal for the termination (4) of FIG. 1, consisting of m=4 resistors (401) (402) (403) (404);

it is possible to define an impedance matrix $Z_{C2}$ with respect to the common terminal for the termination (4) of FIG. 2, consisting of m+1=5 resistors (401) (402) (403) (404) (410), but the equation (2) shows that this square matrix of size (m+1)×(m+1) is not diagonal, because, for pseudo-differential transmission, the common terminal cannot be connected to the reference terminal, hence $R_D \neq 0$.

A passive linear two-terminal circuit element has an impedance which may be regarded as a small-signal impedance which does not depend on the quiescent operating point. Consequently, as explained above, according to the invention, the termination circuit in the activated state may be such that each of said passive linear two-terminal circuit elements has an impedance having, in at least a part of said known frequency band, an absolute value less than or equal to thousand ohms and a real part greater than or equal to three ohms and greater than or equal to one tenth of said absolute value.

An interfacing device of the invention may be such that said termination circuit is made of a network of m resistors, each of said resistors being connected between one of said signal terminals and said common terminal, each of said resistors being connected to a different signal terminal.

A termination circuit made of a network of resistors is however not at all a characteristic of the invention. By way of a first example, designers may, in order to reduce the power consumed by the termination circuit, choose to allow the termination circuit to be effective only in a relevant interval of frequencies, for instance by including suitable reactive circuit elements in the termination circuit. By way of a second example, the termination circuit could include active components, for instance insulated gate field-effect transistors (MOSFETs) operating in the ohmic regime. The impedance of the channel of such components may be adjustable by electrical means. Consequently, said termination circuit may be such that the impedance matrix, with respect to said common terminal, of said termination circuit in the activated state can be adjusted by electrical means.

In the case where the termination circuit has an activated state and a deactivated state, the impedance of the channel of one or more MOSFETs may for instance be controlled by one or more control signals taking on different values in the activated state and in the deactivated state. Consequently, said termination circuit may be such that said termination circuit has an activated state and a deactivated state, the impedance matrix, with respect to said common terminal, of said termination circuit in the activated state being different from the impedance matrix, with respect to said common terminal, of said termination circuit in the deactivated state.

In the case where the termination circuit has an activated state and a deactivated state, components such as transistors may for instance be used as switches having a closed state and an open state. In this case, said transistors may for instance be in the closed state when the termination circuit is in the activated state, and be in the open state when the termination circuit is in the deactivated state. Consequently, said termination circuit may be such that said termination circuit has an activated state and a deactivated state, each current flowing from said termination circuit to one of said signal terminals being substantially zero when said termination circuit is in the deactivated state.

The specialist understands that the first function of the termination circuit is to reduce the reflections at the end of the interconnection to which it is connected. Compared to prior art terminations for pseudo-differential transmission, which are connected to the reference conductor (ground) as shown in FIGS. 1 and 2, the device of the invention receiving signals when its termination circuit is in the activated state is advantageous because:
- the termination circuit does not produce return currents flowing mainly in the reference conductor or in a power supply conductor;
- reflections may be very effectively reduced.

The specialist understands that this situation improves transmission and reduces unwanted couplings with other electronic circuits near the interconnection.

A device of the invention may further comprise a transmitting circuit receiving q "input signals of the transmitting circuit" corresponding each to a transmission channel, q being an integer greater than or equal to 2 and less than or equal to m, the output of the transmitting circuit delivering, when the transmitting circuit is in the activated state, q transmission variables, each transmission variable being either a voltage applied to one of said signal terminals or a current flowing out of one of said signal terminals, each transmission variable being mainly determined by one and only one of said "input signals of the transmitting circuit".

According to the invention, the output of said transmitting circuit is coupled to at least q of said signal terminals. The output of said transmitting circuit may also be coupled to said common terminal. Conversely, the output of said transmitting circuit may be not coupled to said common terminal.

According to the invention, each transmission variable delivered by the transmitting circuit is determined by one and only one of said "input signals of the transmitting circuit", when the transmitting circuit is in the activated state. According to the invention, it is possible that there is a deactivated state of the transmitting circuit, in which the behavior of the transmitting circuit is different. However, the existence of a deactivated state of the transmitting circuit is not at all a characteristic of the invention.

An interfacing device of the invention may be such that said termination circuit has no part in common with said receiving circuit and/or, if the device of the invention comprises a transmitting circuit, with said transmitting circuit. Conversely, an interfacing device of the invention may be such that said termination circuit has one or more parts in common with said receiving circuit and/or with said transmitting circuit.

Said interconnection having at least m+1 conductors may be realized using a cable. Said interconnection may also be realized without using a cable, for instance an interconnection formed in or on a rigid or flexible printed circuit board (using traces and/or copper areas), or an interconnection formed in or on the substrate of a multi-chip module (MCM) or of an hybrid circuit, or an interconnection formed inside a monolithic integrated circuit.

A device of the invention may be such that it constitutes a part of an integrated circuit, said interconnection being realized inside said integrated circuit. In this case, it is possible that said m signal terminals and/or said common terminal are not coupled to pins of said integrated circuit.

A device of the invention may be such that it constitutes a part of an integrated circuit, each of said m signal terminals being coupled to one or more pins of said integrated circuit, said common terminal being coupled to one or more pins of said integrated circuit. This configuration is appropriate when said interconnection is realized outside said integrated circuit. The specialist notes that if there are many signal terminals, for instance more than 16 signal terminals, the absolute value of the current which may flow through the common terminal may become much larger than the maximum absolute value of the current flowing through a single signal terminal. Consequently, in this case, if a single pin is allocated to the common terminal, a degradation of transmission may occur for fast signals, because of the inductance of a connection using a single pin. In this case, using several pins for the common terminal reduces this inductance and improves transmission.

The number m of signal terminals may be equal to the number p of "output signals of the receiving circuit". In the opposite case, m>p, and the signal terminals which are not used for determining an "output signal of the receiving circuit" may have another function, for instance receiving reference voltages or power feeding.

If the device of the invention comprises said transmitting circuit, the number m of signal terminals may be equal to the number q of "input signals of the transmitting circuit". In the opposite case, m>q, and the signal terminals which are not allocated to a transmission variable may have another function, for instance providing reference voltages or power feeding. In particular, m may be greater than or equal to three.

According to the invention, the p "output signals of the receiving circuit" may for instance be delivered using p single-ended links. According to the invention, the p "output signals of the receiving circuit" may for instance be delivered using p differential links. According to the invention, the q "input signals of the transmitting circuit" may for instance be applied to the transmitting circuit using q single-ended links.

According to the invention, the q "input signals of the transmitting circuit" may for instance be applied to the transmitting circuit using q differential links According to the invention, said termination circuit is coupled to each of said signal terminals and to said common terminal, and the termination circuit in the activated state is, for said signal terminals and said common terminal, approximately equivalent to a network consisting of m branches having the above-mentioned characteristics. These characteristics imply that the termination circuit in the activated state behaves, for said signal terminals and said common terminal, as if it was not connected to said reference terminal. However, a device of the invention may further comprise a damping circuit coupled to said common terminal, the damping circuit being, for said common terminal, approximately equivalent to a network consisting of a passive two-terminal circuit element and a voltage source delivering a constant voltage, the passive two-terminal circuit element having a first terminal connected to said common terminal, the passive two-terminal circuit element having a second terminal connected to the first terminal of the voltage source, the second terminal of the voltage source being connected to said reference terminal (ground). Since a pseudo-differential link does not use signals applied between the common conductor and ground, the function of the damping circuit is not to reduce the reflections of signals. The specialist understands that the damping circuit provides a damping of the resonances of the circuit consisting of the common conductor and the reference conductor, which may be excited by the noise produced by unwanted electromagnetic couplings. The damping circuit may therefore reduce the effects of unwanted electromagnetic couplings.

A device of the invention comprising a damping circuit may be such that said passive two-terminal circuit element belonging to said network approximately equivalent to said damping circuit may be considered as linear. Consequently, according to the invention, said damping circuit may be, for said common terminal, approximately equivalent to a network consisting of a passive linear two-terminal circuit element having a first terminal coupled to said common terminal and a second terminal held at a (positive, negative or zero) fixed voltage with respect to said reference terminal. Such a damping circuit is characterized, at any non-zero frequency, by a scalar impedance.

It is important to observe that the combination of such a damping circuit and of said termination circuit presents, with respect to said common terminal, at any given frequency, a diagonal impedance matrix of size $(m+1) \times (m+1)$. We note that this characteristic does not apply to prior art terminations of FIG. 1 and FIG. 2.

It is also possible to use a damping circuit having an activated state and a deactivated state. Consequently, a device of the invention may comprise a damping circuit coupled to said common terminal, the damping circuit in the activated state being, for said common terminal, approximately equivalent to a network consisting of a passive two-terminal circuit element connected in parallel with a current source delivering a constant current, the passive two-terminal circuit element having a first terminal connected to said common terminal, the passive two-terminal circuit element having a second terminal connected to said reference terminal (ground). In this definition of a damping circuit, a current source delivering a positive, negative or zero current replaces the voltage source present in the equivalent network used in the previous definitions of a damping circuit.

An interfacing device of the invention may be such that said damping circuit has no part in common with said receiving circuit and/or with said termination circuit and/or, if the device of the invention comprises a transmitting circuit, with said transmitting circuit. Conversely, an interfacing device of the invention may be such that said damping circuit has one or more parts in common with said receiving circuit and/or with said termination circuit and/or with said transmitting circuit.

Even in the case of a device of the invention in which said receiving circuit, said termination circuit, said damping circuit (if the device of the invention comprises a damping circuit) and said transmitting circuit (if the device of the invention comprises a transmitting circuit) are not without any part in common to any two of them, the specialist understands that the functions of the receiving circuit, of the termination circuit, of the damping circuit (if the device of the invention comprises a damping circuit) and of the transmitting circuit (if the device of the invention comprises a transmitting circuit) are distinct. The definition of a device of the invention, this definition being based on the presence of a receiving circuit, of a termination circuit, and possibly of a damping circuit and/or of a transmitting circuit, must therefore be understood as a definition relating to functions.

According to the invention, the receiving circuit and/or the transmitting circuit may have a filtering function, for instance for the purpose of obtaining a pre-emphasis, a de-emphasis or an equalization improving transmission. It then becomes necessary to synthesize the corresponding filters, either as analog filters or as digital filters, using one of the many methods known to specialists.

When losses are not negligible in the interconnection, phase and amplitude distortions may occur, which are referred to as the distortions caused by propagation. The reduction of these distortions may be obtained, in a device of the invention, using an equalization reducing the effects of the distortions caused by propagation, said equalization being implemented in said receiving circuit and/or in said transmitting circuit. This type of processing, which is also sometimes referred to as compensation, is well known to specialists, and may be implemented using analog signal processing and/or digital signal processing. Specialists know that it is commonplace to use adaptive algorithms for implementing this type of processing in receivers for data transmission. A device of the invention may use an adaptive equalization. This type of processing is well known to specialists, and is often implemented using digital signal processing.

BRIEF DESCRIPTION OF THE DRAWINGS

Other advantages and characteristics of the invention will appear more clearly from the following description of particular embodiments of the invention, given by way of non-limiting examples, with reference to the accompanying drawings in which:

FIG. 11 shows a termination circuit used in a seventh embodiment;

FIG. 12 shows a cell of the termination circuit used in the seventh embodiment;

FIG. 13 shows a symbol for the cell of FIG. 12;

DETAILED DESCRIPTION OF SOME EMBODIMENTS

First Embodiment

Figure 1:
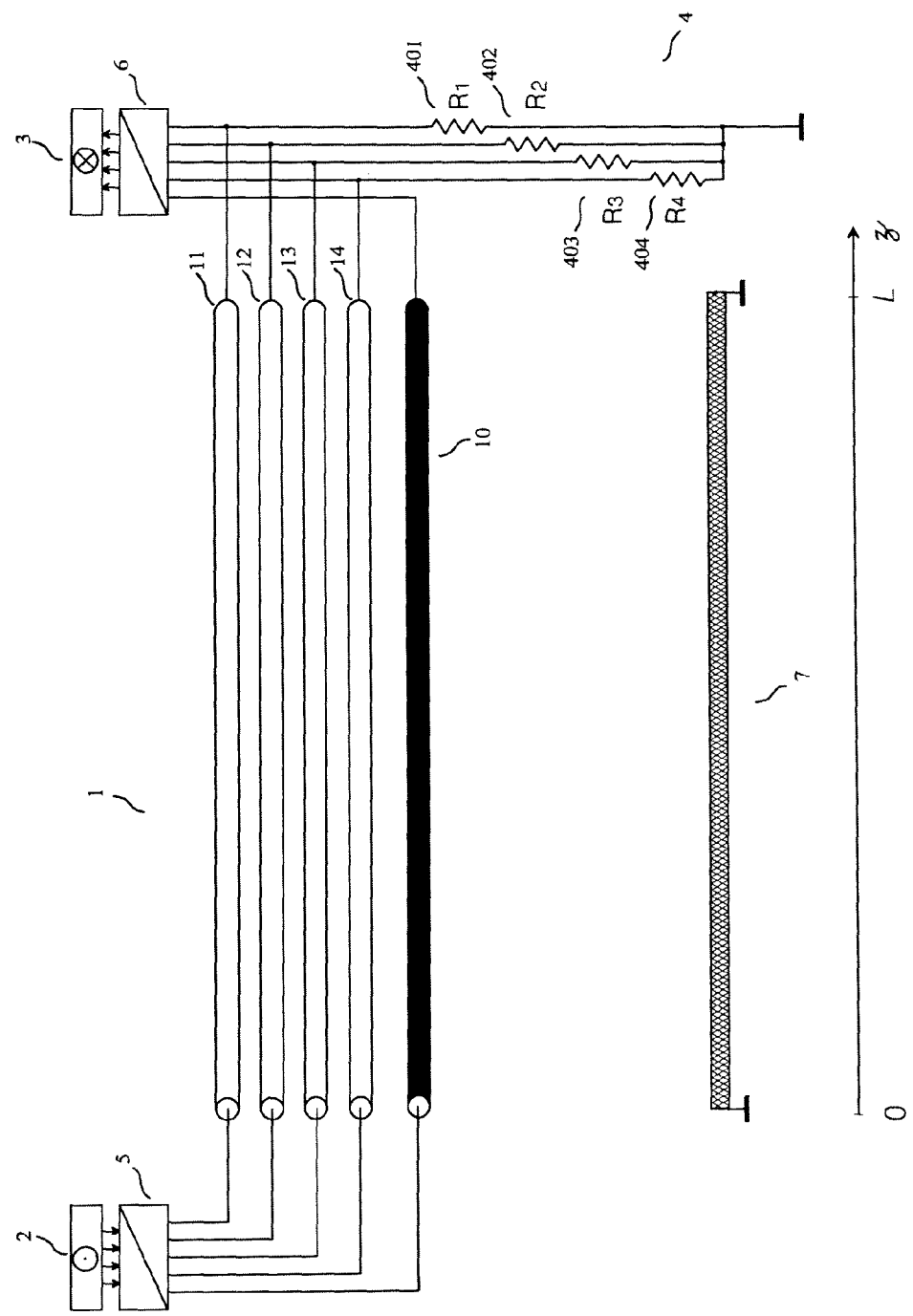
FIG. 1 shows a first pseudo-differential system for transmission comprising an interconnection having four transmission conductors, and has already been discussed in the section dedicated to the presentation of prior art.
Figure 2:
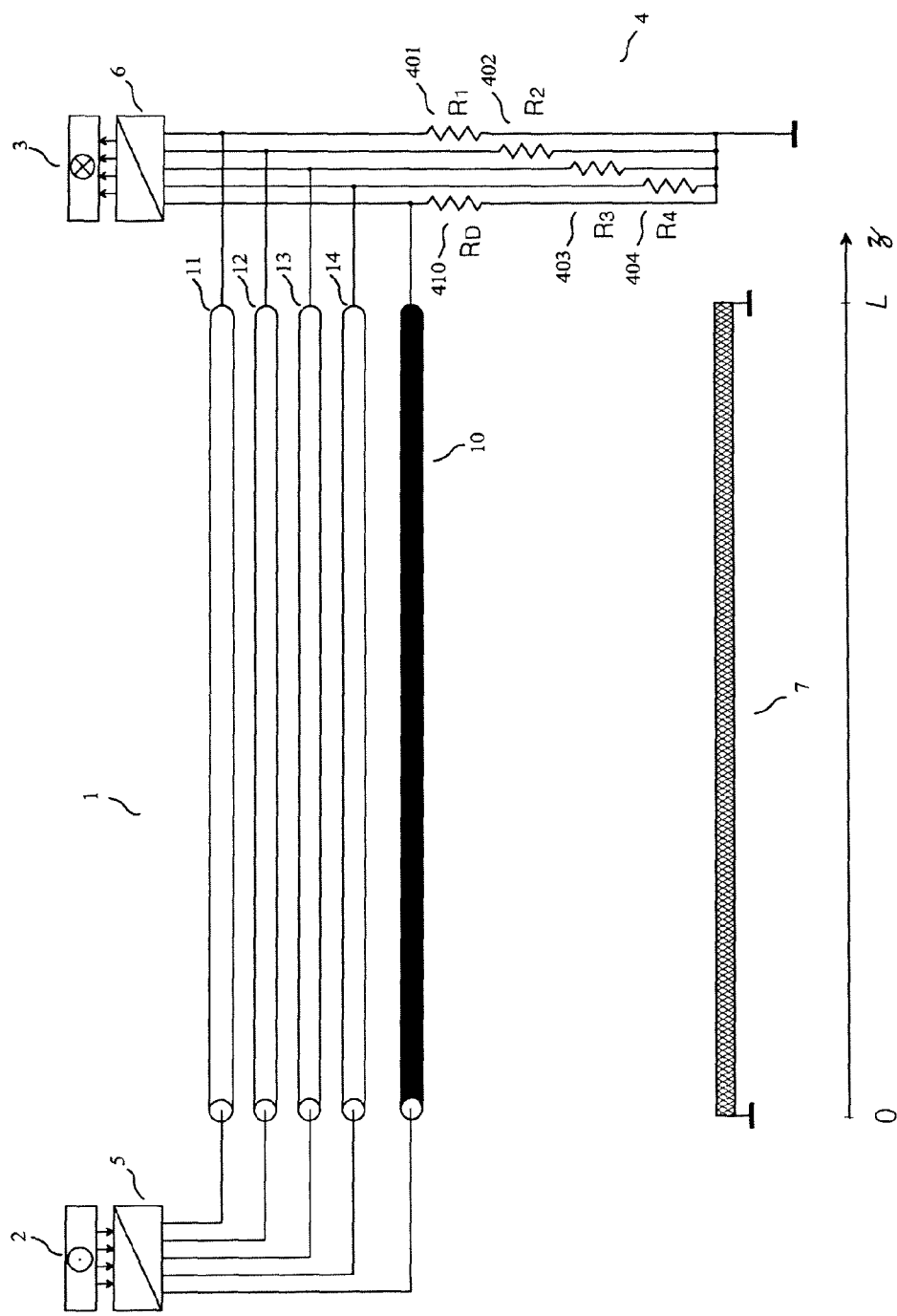
FIG. 2 shows a second pseudo-differential system for transmission comprising an interconnection having four transmission conductors, and has already been discussed in the section dedicated to the presentation of prior art.
Figure 3:
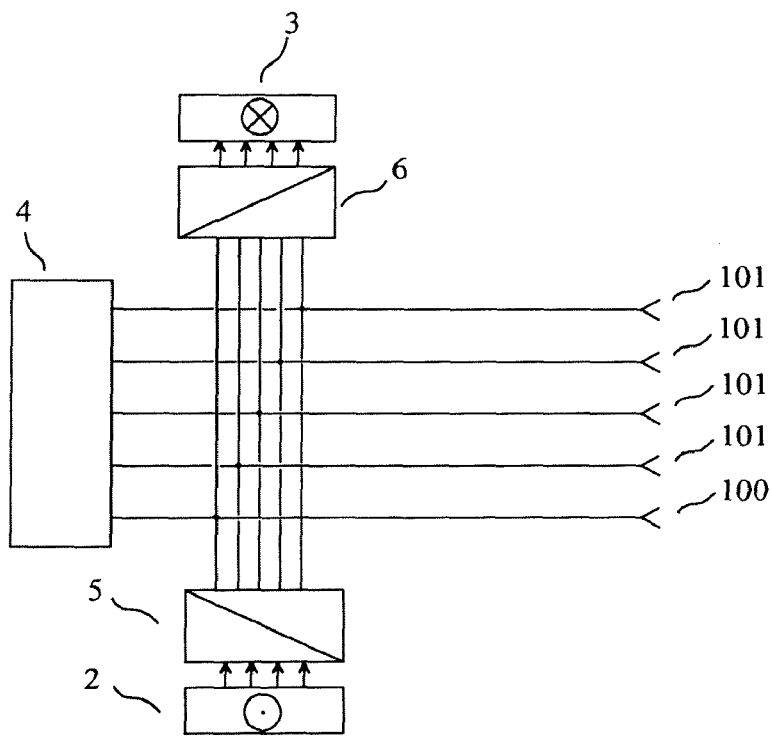
FIG. 3 shows a first embodiment of the invention.

As a first embodiment of an interfacing device of the invention, given by way of non-limiting example, we have represented in FIG. 3 an interfacing device of the invention built inside an integrated circuit, comprising m=4 signal terminals (101) and a common terminal (100), the signal terminals (101) and the common terminal (100) being intended to be connected to an interconnection having at least m+1=5 conductors.

A transmitting circuit (5) receives q=4 "input signals of the transmitting circuit" coming from a source (2), the output of the transmitting circuit being coupled to the 4 signal terminals (101) and to the common terminal (100). The output of the transmitting circuit (5) delivers, when the transmitting circuit is in the activated state, q=4 transmission variables, each transmission variable being a voltage applied to one of said signal terminals (101), each transmission variable being mainly determined by only one of said "input signals of the transmitting circuit". When the transmitting circuit (5) is not in the activated state, its output presents a high impedance, so that the transmitting circuit (5) does not produce transmission variables and only causes a negligible current through the signal terminals (101) and the common terminal (100).

A receiving circuit (6) delivers, when the receiving circuit is in the activated state, p=4 "output signals of the receiving circuit" corresponding each to a transmission channel, the input of the receiving circuit being coupled to the 4 signal terminals (101) and to the common terminal (100), each of said "output signals of the receiving circuit" being determined by the voltage between one of said signal terminals (101) and said common terminal (100). The "output signals of the receiving circuit" are delivered to the destination (3). When the receiving circuit (6) is not in the activated state, its output presents a high impedance, so that the receiving circuit (6) does not deliver any "output signal of the receiving circuit".

The specialists know several methods suitable for producing a high impedance state at the output of the transmitting circuit (5) and at the output of the receiving circuit (6). The possibility of controlling the activated state of a transmitting circuit and/or of a receiving circuit is usually used in data bus architectures. We note that the circuits needed to control the activated state of the transmitting circuit (5) and of the receiving circuit (6) at a given point in time are not shown in FIG. 3. We also note that the address and/or control lines necessary for coordinating the activated state of the transmitting circuit (5) and of the receiving circuit (6) with the operation of the other entities connected to such a bus are not shown in FIG. 3. These address and/or control lines could be conductors of said interconnection.

A termination circuit (4) is coupled to each of said signal terminals (101) and to the common terminal (100). When the transmitting circuit (5) is not in the activated state, the termination circuit (4) is in the activated state and is, for said signal terminals (101) and said common terminal (100), approximately equivalent to a network shown in FIG. 4, this network consisting of m branches, each branch consisting of a passive linear two-terminal circuit element (811) (812) (813) (814) connected in series with a voltage source (821) (822) (823) (824) delivering a constant voltage, the first terminal of each of said branches being connected to one and only one of said signal terminals (101), the second terminal of each of said branches being connected to said common terminal (100). The specialist sees that, when the transmitting circuit (5) is not in the activated state, at any given frequency:

the termination circuit (4) has an impedance matrix $Z_{CT}$ with respect to said common terminal;

the termination circuit (4) does not have an impedance matrix with respect to said reference terminal.

Figure 4:
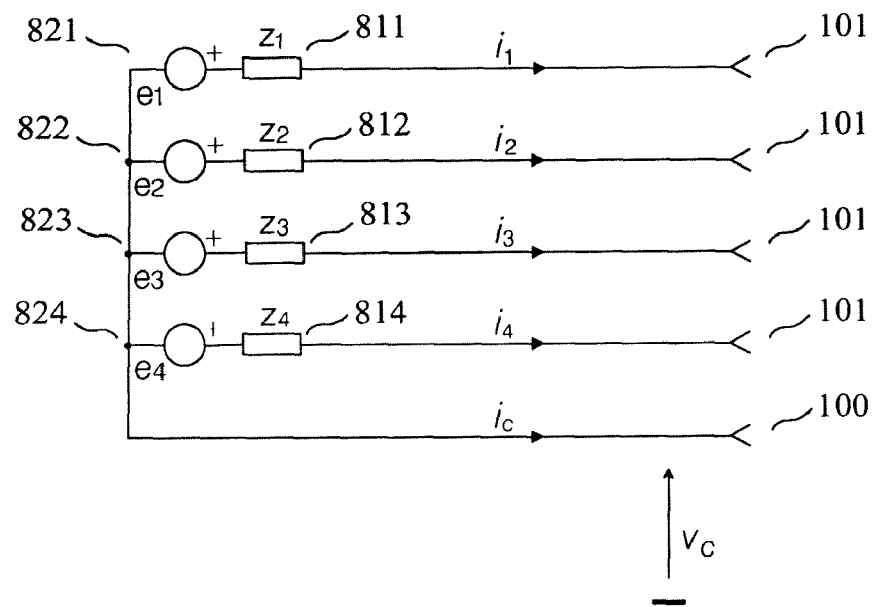
FIG. 4 shows an equivalent network for the signal terminals and the common terminal in the first embodiment.

Said impedance matrix $Z_{CT}$ is a diagonal matrix of size m×m equal to $$Z_{CT} = \begin{pmatrix} Z_1 & 0 & 0 & 0 \\ 0 & Z_2 & 0 & 0 \\ 0 & 0 & Z_3 & 0 \\ 0 & 0 & 0 & Z_4 \end{pmatrix} \quad (4)$$

using the notations of FIG. 4 and a suitable numbering of the signal terminals (101).

An interconnection coupled to the signal terminals (101) and to the common terminal (100) sees a circuit element having m+2=6 terminals if we include the reference terminal (ground). The input of the receiving circuit (6) always presents a high impedance, so that, when the transmitting circuit (5) is not in the activated state, the currents through the signal terminals (101) and the common terminal (100) are mainly determined by the termination circuit (4). Consequently, the FIG. 4 also corresponds to an equivalent network of the circuit element having m+2 terminals seen by the interconnection when the transmitting circuit (5) is not in the activated state, in an ideal implementation. The specialists understand that such an equivalent network is only suitable for determining the voltages between these m+2 terminals and the currents flowing out of these terminals. We note that this equivalent network does not comprise any connection to the reference terminal (ground). Consequently, in FIG. 4, the current $i_C$ flowing out of said common terminal (100) is equal to the opposite of the sum of the currents $i_1, \ldots, i_m$ flowing out of said signal terminals (101), that is to say $$i_C \approx -\sum_{a=1}^{m} i_a \quad (5)$$

The voltage $v_C$ between said common terminal (100) and ground has therefore no effect on $i_C$. The specialist understands that, in a real implementation, it is possible that this equality is not exactly satisfied.

The specialist understands how he may, using prior art techniques, design a termination circuit (4), a transmitting circuit (5) and a receiving circuit (6) meeting the characteristics specified for this first embodiment.

Second embodiment

Best Mode

Figure 5:
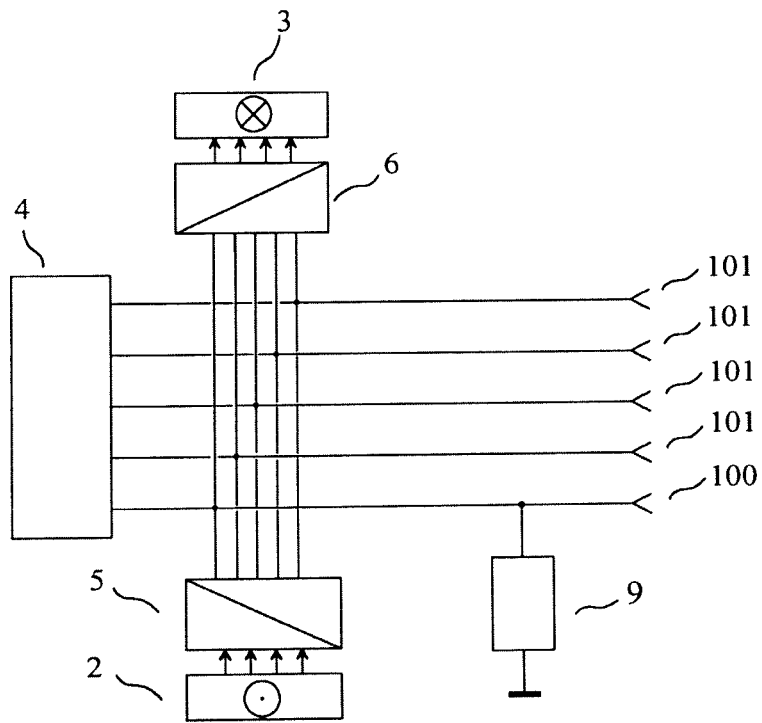
FIG. 5 shows a second embodiment of the invention.

As a second embodiment of an interfacing device of the invention, given by way of non-limiting example and best mode of carrying out the invention, we have represented in FIG. 5 an interfacing device of the invention built inside an integrated circuit, comprising m=4 signal terminals (101) and a common terminal (100), the signal terminals (101) and the common terminal (100) being intended to be connected to an interconnection having m+1=5 conductors.

A transmitting circuit (5) receives q=4 "input signals of the transmitting circuit" coming from a source (2), the output of the transmitting circuit being coupled to the 4 signal terminals (101) and to the common terminal (100). The output of the transmitting circuit (5) delivers, when the transmitting circuit is in the activated state, q=4 transmission variables, each transmission variable being a current flowing out of one of said signal terminals (101), each transmission variable being mainly determined by only one of said "input signals of the transmitting circuit". When the transmitting circuit (5) is not in the activated state, its output presents a high impedance, so that the transmitting circuit (5) does not produce transmission variables and only causes a negligible current through the signal terminals (101) and the common terminal (100).

A receiving circuit (6) identical to the one of the first embodiment delivers, when it is in the activated state, "output signals of the receiving circuit" to the destination (3).

A termination circuit (4) identical to the one of the first embodiment is coupled to each of said signal terminals (101) and to said common terminal (100). A damping circuit (9) is connected to said common terminal (100). The termination circuit (4) in the activated state and the damping circuit (9) are, for said signal terminals (101) and said common terminal (100), approximately equivalent to a network shown in FIG. 6, this network consisting of:

m branches corresponding to the termination circuit (4), each branch consisting of a passive linear two-terminal circuit element (811) (812) (813) (814) connected in series with a voltage source (821) (822) (823) (824) delivering a constant voltage, the first terminal of each of said branches being connected to one and only one of said signal terminals (101), the second terminal of each of said branches being connected to said common terminal (100);

one branch corresponding to the damping circuit (9), this branch consisting of a passive linear two-terminal circuit element (83) connected in series with a voltage source (84) delivering a constant voltage, the first terminal of this branch being connected to said common terminal (100), the second terminal of this branch being connected to said reference terminal.

When the transmitting circuit (5) is not in the activated state, the termination circuit (4) is in the activated state, so that, at any given frequency:

the termination circuit (4) has an impedance matrix $Z_{CT}$ with respect to said common terminal, given by equation (4);

the termination circuit (4) does not have an impedance matrix with respect to said reference terminal;

the combination of the damping circuit (9) and the termination circuit (4) has an impedance matrix $Z_{CL}$ with respect to said common terminal;

the combination of the damping circuit (9) and the termination circuit (4) has an impedance matrix $Z_{GL}$ with respect to said reference terminal.

Figure 6:
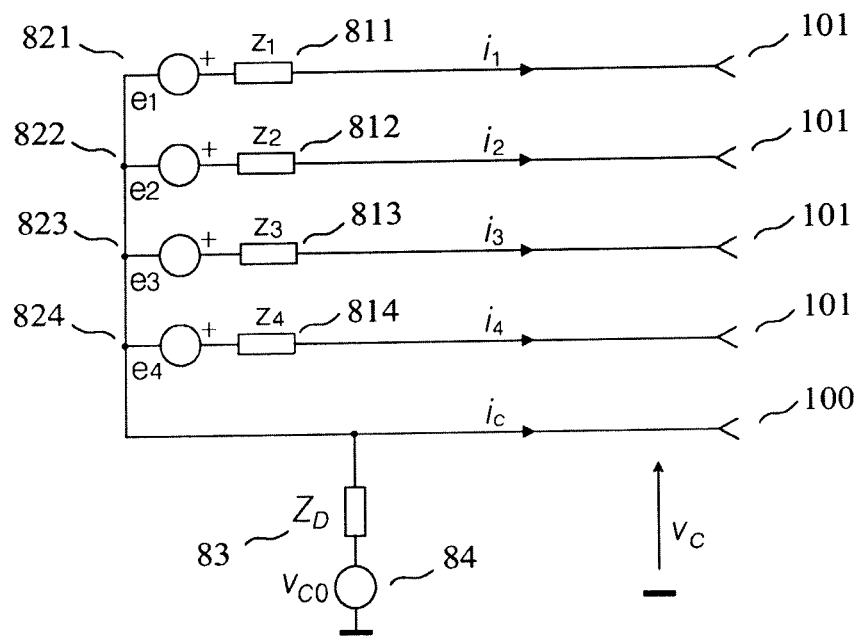
FIG. 6 shows an equivalent network for the signal terminals and the common terminal in the second embodiment.

Said impedance matrix $Z_{CL}$ and said impedance matrix $Z_{GL}$ are square matrices of size (m+1)×(m+1) equal to $$Z_{CL} = \begin{pmatrix} Z_1 & 0 & 0 & 0 & 0 \\ 0 & Z_2 & 0 & 0 & 0 \\ 0 & 0 & Z_3 & 0 & 0 \\ 0 & 0 & 0 & Z_4 & 0 \\ 0 & 0 & 0 & 0 & Z_D \end{pmatrix} \quad (6)$$

and $$Z_{GL} = \begin{pmatrix} Z_1+Z_D & Z_D & Z_D & Z_D & Z_D \\ Z_D & Z_2+Z_D & Z_D & Z_D & Z_D \\ Z_D & Z_D & Z_3+Z_D & Z_D & Z_D \\ Z_D & Z_D & Z_D & Z_4+Z_D & Z_D \\ Z_D & Z_D & Z_D & Z_D & Z_D \\ Z_D & Z_D & Z_D & Z_D & Z_D \end{pmatrix} \quad (7)$$

using the notations of FIG. 6 and a suitable numbering of the signal terminals (101) and of the reference terminal (100). Consequently, said impedance matrix $Z_{CL}$ with respect to said common terminal is a diagonal matrix whereas said impedance matrix $Z_{GL}$ with respect to said reference terminal is not a diagonal matrix if $Z_D \neq 0$.

An interconnection coupled to the signal terminals (101) and to the common terminal (100) sees a circuit element having m+2=6 terminals if we include the reference terminal (ground). The input of the receiving circuit (6) always presenting a high impedance, the currents through the signal terminals (101) and the common terminal (100) are mainly determined by the termination circuit (4) and the damping circuit (9), when the transmitting circuit (5) is not in the activated state. Consequently, the FIG. 6 also corresponds to an equivalent network of the circuit element having m+2 terminals seen by the interconnection when the transmitting circuit (5) is not in the activated state, in an ideal implementation. In FIG. 6, the current $i_C$ flowing out of said common terminal (100) is, at a given frequency f, $$\text{for } f \neq 0 \quad i_C \approx -\sum_{\alpha=1}^{m} i_\alpha - \frac{v_C}{Z_D} \quad (8)$$

$$\text{and for } f = 0 \quad i_C \approx -\sum_{\alpha=1}^{m} i_\alpha + \frac{v_{C0} - v_C}{Z_D} \quad (9)$$

The specialist understands that, in a real implementation, it is possible that these equalities are not exactly satisfied.

Third Embodiment

Figure 7:
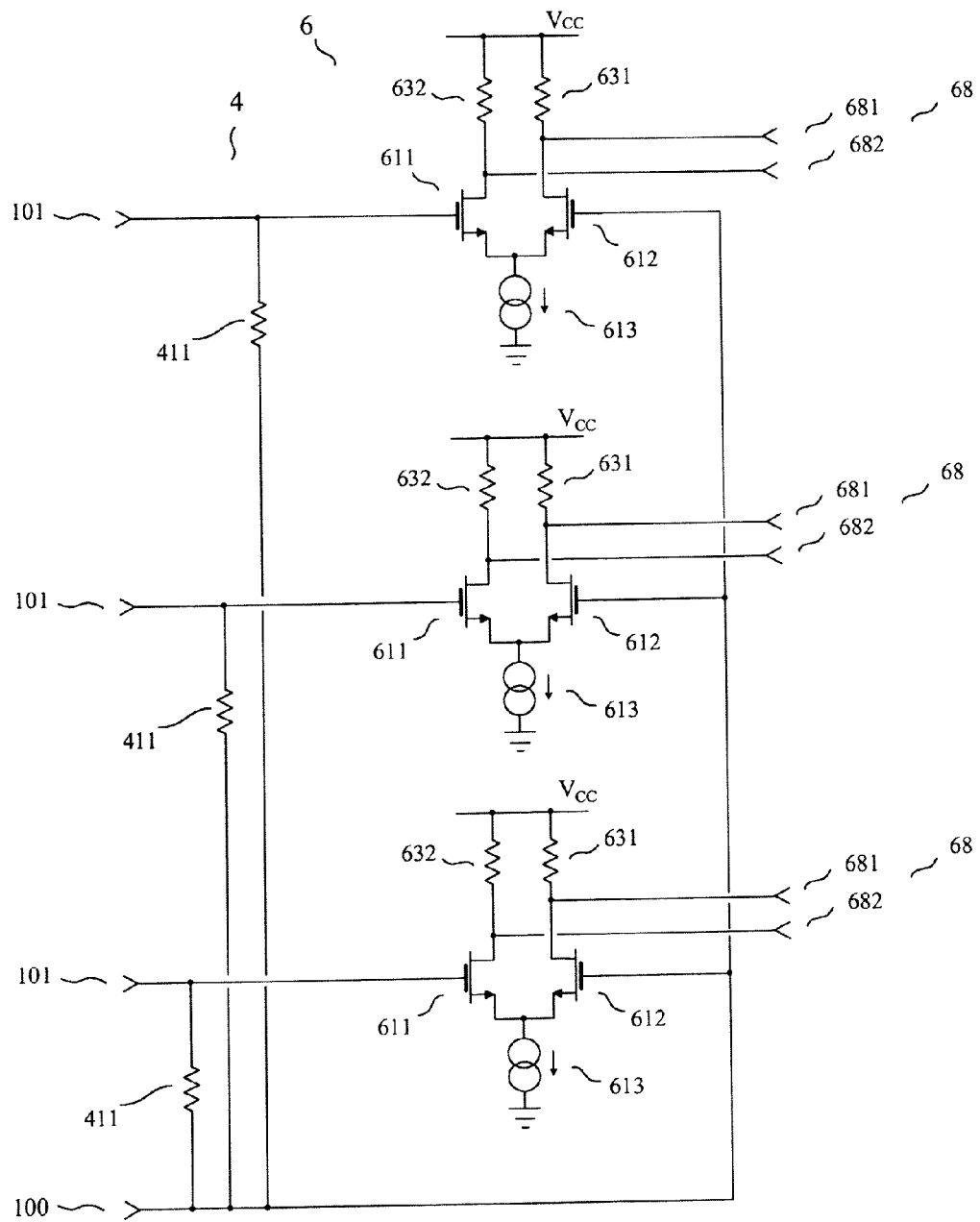
FIG. 7 shows a receiving circuit and a termination circuit used in a third embodiment.

The third embodiment of an interfacing device of the invention, given by way of non-limiting example, comprises the receiving circuit and the termination circuit shown in FIG. 7.

The receiving circuit (6) and the termination circuit (4) shown in FIG. 7 are such that:

each of the p=3 "output signals of the receiving circuit" is delivered to an output (68) which is a differential output comprising 2 terminals (681) (682);

each of the p outputs (68) corresponds to the output of a differential pair made of two transistors (611) (612) whose sources are biased by a current source (613) and whose drains are biased by two resistors (631) (632);

each of the m=3 signal terminals (101) is connected to the gate of the first transistor (611) of one of said differential pairs;

the common terminal (100) is connected to the gate of the p second transistors (612) of said differential pairs;

the termination circuit (4) is made of m resistors (411) having a resistance of 100Ω, each of these resistors being connected between one of said signal terminals (101) and said common terminal (100);

the receiving circuit (6) consists of all components shown in FIG. 7, except the m resistors (411) connected between one of said signal terminals (101) and said common terminal (100).

The specialist understands that the current sources (613) shown in FIG. 7 are ideal circuit elements which may be realized with real components, for instance using current mirrors. Let us note that one of the terminals of each of the current sources (613) is grounded, the ground symbol used in FIG. 7 (and in FIG. 14 discussed later) having exactly the same meaning as the other ground symbol used in some of the other accompanying drawings. The specialist sees that the receiving circuit (6) shown in FIG. 7 produces at its outputs p "output signals of the receiving circuit" corresponding each to one of the transmission channels, each of the "output signals of the receiving circuit" being determined by the voltage between one of said signal terminals (101) and said common terminal (100).

In FIG. 7, if we neglect the gate currents of the transistors (611) (612) of the differential pairs, only the resistors (411) of the termination circuit (4) produce currents through the signal terminals (101) and through the common terminal (100). We note that, in this third embodiment, the termination circuit (4) is equivalent to a network consisting of m branches, each of said branches consisting of a resistor (411) connected in series with a voltage source providing a zero voltage. We also note that, in this third embodiment, the termination circuit (4) is always in the activated state.

This third embodiment is appropriate for receiving analog or digital signals.

Fourth Embodiment

Figure 8:
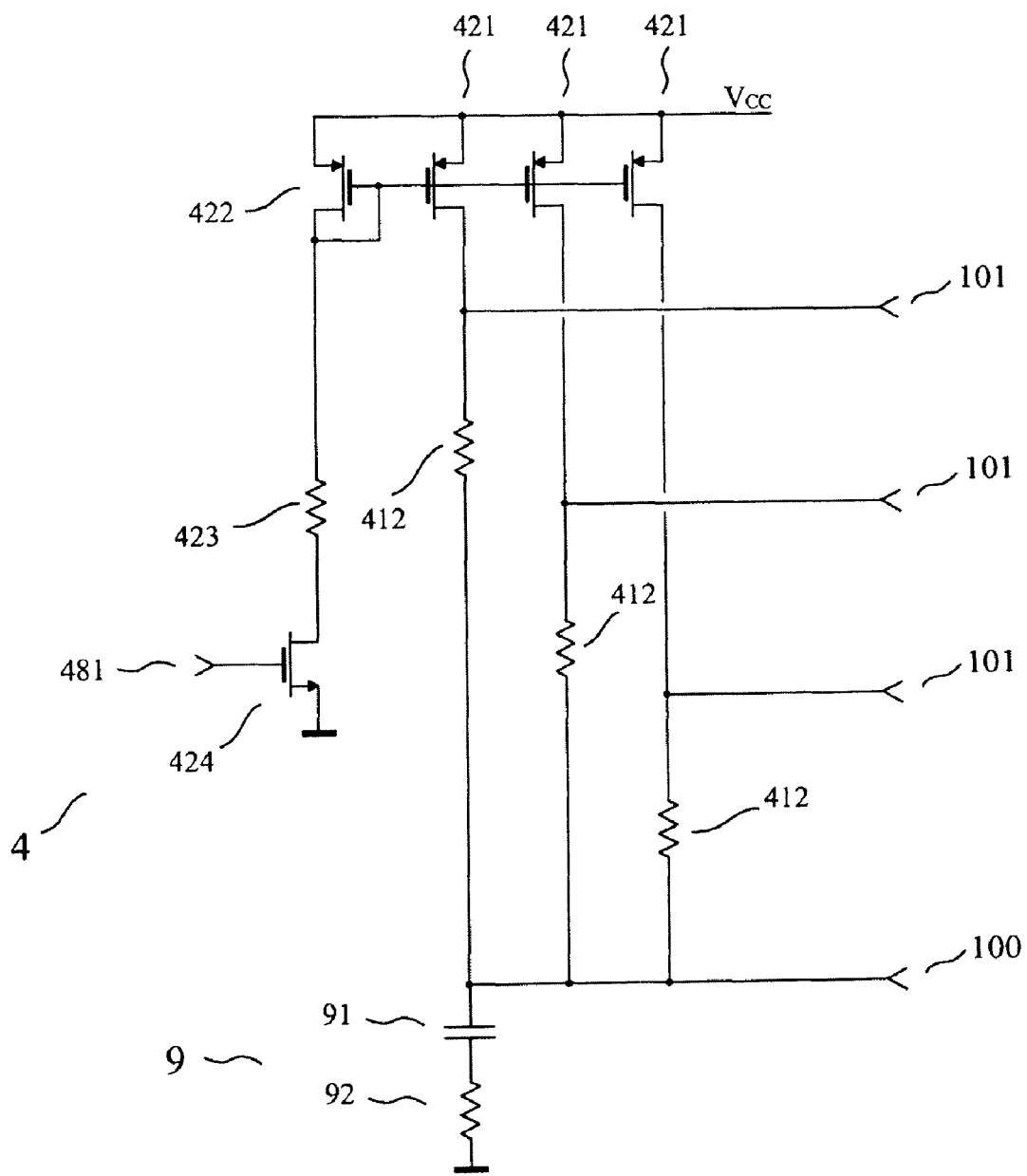
FIG. 8 shows a termination circuit and a damping circuit used in a fourth embodiment.

The fourth embodiment of an interfacing device of the invention, given by way of non-limiting example, comprises the termination circuit (4) and the damping circuit (9) shown in FIG. 8, in which:

each of the m=3 signal terminals (101) is connected to the first terminal of a resistor (412) of resistance $R_{412}$;

the common terminal (100) is connected to the second terminal of each of said resistors (412);

a "control signal of the termination circuit" is applied to a control input (481) connected to the gate of a control transistor (424) whose drain is connected to a resistor (423) connected in series with the input of a current mirror comprising an input transistor (422) and m output transistors (421);

the drain of each output transistor (421) of the current mirror is connected to one of said signal terminals (101);

the damping circuit (9) comprises a branch consisting of a capacitor (91) connected in series with a 10Ω resistor (92), the first terminal of said branch being connected to said common terminal (100), the second terminal of said branch being connected to the reference terminal (ground).

It is possible to consider that, in FIG. 8, the termination circuit (4) consists of the resistors (412) connected to the signal terminals (101), while the control transistor (424), the resistor (423) connected in series with the input of the current mirror, the input transistor (422) and the m output transistors (421) of the current mirror form a biasing circuit. In this case, the termination circuit (4) is always in the activated state and the termination circuit (4) is, for said signal terminals (101) and said common terminal (100), approximately equivalent to a network consisting of m=3 branches having each a first terminal connected to one of said signal terminals (101), each branch having a second terminal connected to said common terminal (100), each branch consisting of a resistor (412) of resistance $R_{412}$.

Alternatively, it is also possible to consider that all circuit elements shown in FIG. 8 belong to the termination circuit (4) and the damping circuit (9), the termination circuit (4) and the damping circuit (9) having the following parts in common: the control transistor (424), the resistor (423) connected in series with the input of a current mirror, the input transistor (422) and the m output transistors (421) of the current mirror. We will now use this point of view.

When the "control signal of the termination circuit" applied to the control input (481) is low, the control transistor (424) is in the open state and the termination circuit (4) is considered as in the deactivated state. In this case, the current at the input of said current mirror is equal to zero and the drains of the output transistors (421) of the current mirror deliver no current to the resistors (412) connected to the signal terminals (101).

When the "control signal of the termination circuit" applied to the control input (481) is high, the control transistor (424) is in the closed state and the termination circuit (4) is considered as in the activated state. In this case, the current at the input of said current mirror takes on a known value and, for a suitable biasing of the signal terminals (101) and of the common terminal (100), the drains of the output transistors (421) of the current mirror deliver a current $I_{421}$, this current $I_{421}$ being practically constant and independent from the signals applied to said signal terminals (101) and said common terminal (100). More precisely, the output transistors (421) are, for said signal terminals (101) and said common terminal (100), approximately equivalent to a grounded current sources of small-signal internal admittance $g_o$, delivering the short-circuit current $I_{421}$, the resistance $R_{412}$ being much smaller than $1/|g_o|$. If we use $Y_D$ to denote the admittance of the branch consisting of a capacitor (91) connected in series with a 10Ω resistor (92), it is possible to show that, when the termination circuit (4) is in the activated state, for said signal terminals (101) and said common terminal (100):

the termination circuit (4) is approximately equivalent to a network consisting of m=3 branches having each a first terminal connected to one of said signal terminals (101), each branch having a second terminal connected to said common terminal (100), each branch consisting of a resistor (412) of resistance $R_{412}$ connected in series with a voltage source delivering a constant voltage equal to $R_{412}I_{421}$;

the damping circuit (9) is approximately equivalent to a network consisting of a passive linear two-terminal circuit element of small signal admittance $Y_D+3g_o$, the passive linear two-terminal circuit element having a first terminal coupled to said common terminal and a second terminal held at a fixed voltage $I_{421}/g_o$ with respect to the reference terminal (this network being exactly equivalent to a passive linear two-terminal circuit element of small signal admittance $Y_D+3g_o$ connected in parallel with a current source delivering a constant current $3I_{421}$, the passive two-terminal circuit element having a first terminal connected to said common terminal and a second terminal connected to the reference terminal).

For instance, let us assume that, at 0 Hz, $g_o=10^{-4}$ S and $R_{412}=100\Omega$. For the signal terminals (101) and the common terminal (100), let us use $Z_{GL3}$ to denote the impedance matrix with respect to said reference terminal of the circuit shown in FIG. 8, and $Z_{GL4}$ to denote the impedance matrix with respect to said reference terminal of the equivalent networks defined above for the termination circuit (4) and the damping circuit (9). $Z_{GL3}$ and $Z_{GL4}$ are square matrices of size 4×4. If we define the relative error as $$\delta = \frac{\|Z_{GL3} - Z_{GL4}\|}{\|Z_{GL3}\|} \quad (10)$$

where $\|X\|$ denotes the Euclidian norm of the matrix X, we find that δ is about $8.10^{-3}$ at 0 Hz. This indicates that the equivalent networks defined above for the termination circuit (4) and the damping circuit (9) are good approximations of the circuit shown in FIG. 8.

The specialist understands that the termination circuit (4) shown in FIG. 8 is particularly advantageous when one or more devices (not shown in FIG. 8) producing the signals on the interconnection connected to said signal terminals (101) and said common terminal (100) are such that they deliver an almost constant voltage to the common conductor and such that they have open drain outputs connected to the transmission conductors.

The specialist understands that the deactivated state of the termination circuit (4) shown in FIG. 8 may for instance be used in four different ways:

the termination circuit (4) is put in the deactivated state only in a low-consumption mode in which the interconnection connected to said signal terminals (101) and said common terminal (100) is not used, or else the termination circuit (4) is put in the deactivated state only when the receiving circuit of the interfacing device of the invention is not in the activated state, or else the termination circuit (4) is put in the deactivated state only when all the devices capable of producing signals on the interconnection connected to said signal terminals (101) and said common terminal (100) are not in the activated state, or else in the case where the interfacing device of the invention comprises a transmitting circuit, the termination circuit (4) is put in the deactivated state only when the transmitting circuit of the interfacing device of the invention is in the activated state.

The specialist understands that the capacitor (91) and the resistor (92) of the damping circuit (9) may be proportioned for effectively damping the resonances of the circuit consisting of the common conductor and the reference conductor, when this circuit is excited by a noise produced by unwanted electromagnetic couplings.

Fifth Embodiment

Figure 9:
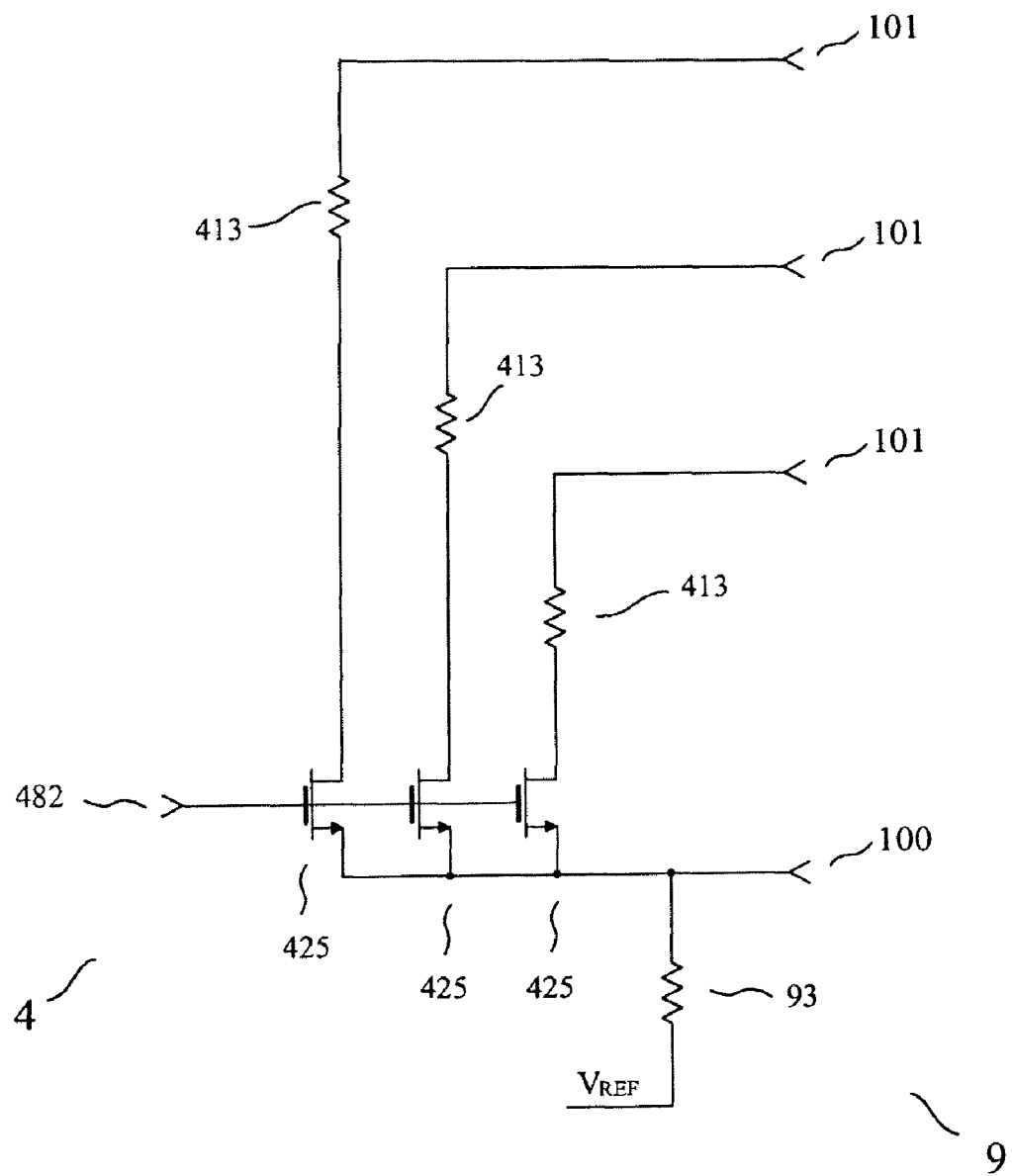
FIG. 9 shows a termination circuit and a damping circuit used in a fifth embodiment.

The fifth embodiment of an interfacing device of the invention, given by way of non-limiting example, comprises the termination circuit (4) and the damping circuit (9) shown in FIG. 9, in which:

each of the m=3 signal terminals (101) is connected to the first terminal of a resistor (413) of resistance $R_{413}$;

a "control signal of the termination circuit" is applied to a control input (482) connected to the gate of m transistors (425), the drain of each transistor (425) being connected to the second terminal of each of said resistors (413);

the common terminal (100) is connected to the source of each transistor (425);

the damping circuit (9) consists of a resistor (93) having a first terminal connected to said common terminal (100) and a second terminal connected to a node having a constant voltage $V_{REF}$ with respect to the reference terminal (ground).

When the "control signal of the termination circuit" applied to the control input (482) is low, the transistors (425) are in the open state for a suitable biasing of the common terminal (100), and the termination circuit (4) is considered as in the deactivated state. In this case, we may consider that the currents flowing through the resistors (413) connected to the signal terminals (101) are equal to zero.

When the "control signal of the termination circuit" applied to the control input (482) is high, the transistors (425) are in the closed state for a suitable biasing of the common terminal (100), and the termination circuit (4) is considered as in the activated state. In this case, each transistor (425) presents a resistance $r_{DS(on)}$ between its source and its drain. The termination circuit (4) in the activated state is therefore, for said signal terminals (101) and said common terminal (100), approximately equivalent to a network consisting of m=3 branches having each a first terminal connected to one of said signal terminals (101), each branch having a second terminal connected to said common terminal (100), each branch consisting of a resistor of resistance $R_{413}+r_{DS(on)}$ connected in series with a voltage source delivering a voltage equal to zero. However, each transistor (425) is only approximately equivalent to a resistance $r_{DS(on)}$ between its source and its drain, because a MOSFET in the ohmic regime has a non-linear characteristic: the resistance between the source and the drain depends on the drain-source voltage. The linearity may nevertheless be improved if the MOSFET is only used as a switch, that is to say in the case $R_{413} \gg r_{DS(on)}$.

This fifth embodiment is intended for receiving digital signals, and the receiving circuit (not shown in FIG. 9) of the interfacing device of the invention may be of any suitable known type of pseudo-differential receiver for digital signals, for instance one of the pseudo-differential receivers described in said U.S. Pat. Nos. 5,994,925 and 7,099,395.

Sixth Embodiment

Figure 10:
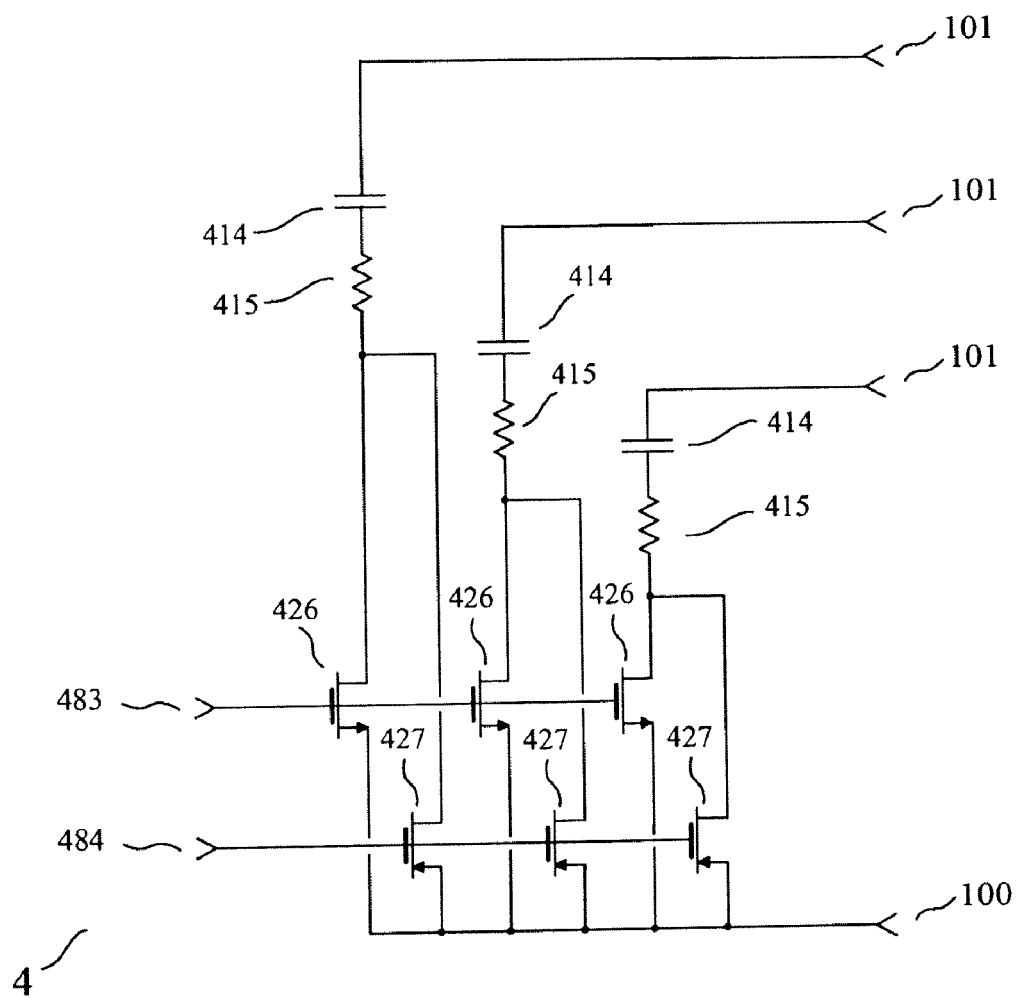
FIG. 10 shows a termination circuit used in a sixth embodiment.

The sixth embodiment of an interfacing device of the invention, given by way of non-limiting example, comprises the termination circuit (4) shown in FIG. 10, in which:

each of the m=3 signal terminals (101) is connected to the first terminal of a branch consisting of a capacitor (414) connected in series with a resistor (415) of resistance $R_{415}$;

a "first control signal of the termination circuit" is applied to a first control input (483) connected to the gate of m n-channel transistors (426), the drain of each n-channel transistor (426) being connected to the second terminal of one of said branches;

a "second control signal of the termination circuit" is applied to a second control input (484) connected to the gate of m p-channel transistors (427), the drain of each p-channel transistor (427) being connected to the second terminal of one of said branches;

the common terminal (100) is connected to the source of each transistor (426) (427).

When the "first control signal of the termination circuit" applied to the first control input (483) is low and the "second control signal of the termination circuit" applied to the second control input (484) is high, the transistors (426) (427) are in the open state for a suitable biasing of the common terminal (100), and the termination circuit (4) is considered as in the deactivated state. In this case, we may consider that the currents flowing through the capacitors (414) connected to the signal terminals (101) are equal to zero.

When the "first control signal of the termination circuit" applied to the first control input (483) is high and the "second control signal of the termination circuit" applied to the second control input (484) is low, the n-channel transistors (426) and/or the p-channel transistors (427) are in the closed state and the termination circuit (4) is considered as in the activated state. Each cell consisting of an n-channel transistor (426) and of a p-channel transistor (427) the drains of which are connected to each other forms a CMOS switch producing a low resistance compared to $R_{415}$ in the activated state, for a wide range of voltages between the common terminal (100) and the reference terminal.

Consequently, the specialist understands that the termination circuit (4) in the activated state is, for said signal terminals (101) and said common terminal (100), approximately equivalent to a network consisting of m=3 branches having each a first terminal connected to one of said signal terminals (101), each branch having a second terminal connected to said common terminal (100), each branch consisting of a capacitor connected in series with a resistor connected in series with a voltage source delivering a voltage equal to zero. The specialist understands the advantages and the limitations of a design in which each transmission conductor sees a capacitor connected in series with a resistor connected to the common terminal (100).

Seventh Embodiment

The seventh embodiment of an interfacing device of the invention, given by way of non-limiting example, comprises the termination circuit (4) shown in FIG. 11, in which:

each of the m=3 signal terminals (101) is connected to the drain of an n-channel transistor (428) and to the drain of a p-channel transistor (429);

a "first control signal of the termination circuit" is applied to a first control input (485) connected to the gate of the m n-channel transistors (428);

a "second control signal of the termination circuit" is applied to a second control input (486) connected to the gate of the m p-channel transistors (429);

the common terminal (100) is connected to the source of each transistor (428) (429).

When the "first control signal of the termination circuit" applied to the first control input (485) is low and the "second control signal of the termination circuit" applied to the second control input (484) is high, the transistors (428) (429) are in the open state for a suitable biasing of the common terminal (100), and the termination circuit (4) is considered as in the deactivated state. In this case, we may consider that the currents flowing through the drains of the transistors (428) (429) are equal to zero.

When the "first control signal of the termination circuit" applied to the first control input (485) is high and the "second control signal of the termination circuit" applied to the second control input (486) is low, the n-channel transistors (428) and/or the p-channel transistors (429) are in the closed state and the termination circuit (4) is considered as in the activated state. In particular, for a suitable biasing of the common terminal (100), the n-channel transistors (428) and the p-channel transistors (429) operate in the ohmic region, and the specialists understand that the transistors (428) (429) may be proportioned to obtain, between each signal terminal (101) and the common terminal (100), a known resistance, with a very good linearity.

Consequently, the specialist understands that the termination circuit (4) in the activated state is, for said signal terminals (101) and said common terminal (100), approximately equivalent to a network consisting of m=3 resistors having each a first terminal connected to one of said signal terminals (101), each of said resistors having a second terminal connected to said common terminal (100), these resistors being adjustable by electrical means, using the "first control signal of the termination circuit" and/or the "second control signal of the termination circuit".

The termination circuits (4) shown in FIG. 10 and in FIG. 11 each use three times the cell (43) shown in FIG. 12, consisting of a n-channel transistor (428) and of a p-channel transistor (429) having their sources connected the one to the other and their drains connected the one to the other. This cell (43) has 4 terminals: a drain terminal (431), a source terminal (432), a terminal (433) for the "first control signal of the termination circuit" and a terminal (434) for the "second control signal of the termination circuit". This cell may be represented with the symbol (43) shown in FIG. 13, in which only the drain terminal (431) and the source terminal (432) are visible, the two other terminals being implicit. The specialist understands that the "source" and "drain" electrodes may be exchanged in the FIGS. 10, 11 and 12 when the transistors are symmetrical, and that it is therefore not inappropriate that the symbol (43) does not distinguish between said drain terminal (431) and said source terminal (432).

Eighth Embodiment

Figure 14:
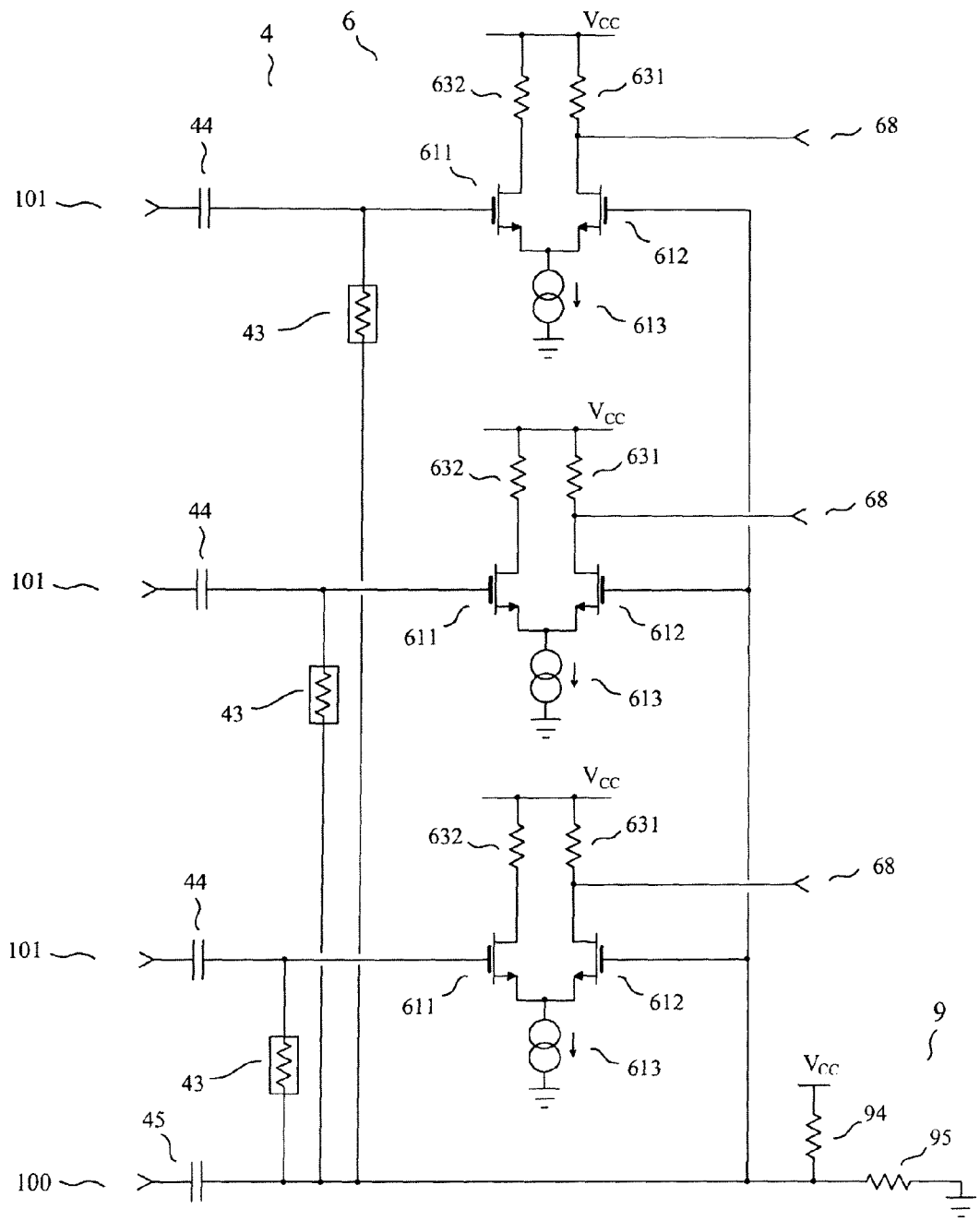
FIG. 14 shows a receiving circuit, a termination circuit and a damping circuit used in a eighth embodiment.

The eighth embodiment of an interfacing device of the invention, given by way of non-limiting example, comprises the receiving circuit, the termination circuit and the damping circuit shown in FIG. 14.

In the receiving circuit (6), the termination circuit (4) and the damping circuit (9) shown in FIG. 14:

each of the p=3 "output signals of the receiving circuit" is delivered to an output (68) which is a single-ended output;

as in FIG. 7, each of the p outputs (68) corresponds to an output of a differential pair made of two transistors (611) (612) whose sources are biased by a current source (613) and whose drains are biased by two resistors (631) (632);

each of the m=3 signal terminals (101) is connected to the first terminal of a capacitor (44) whose second terminal is connected to the gate of the first transistor (611) of one of said differential pairs;

the common terminal (100) is connected to the first terminal of a capacitor (45) whose second terminal is connected to the gate of the p second transistors (612) of said differential pairs;

the termination circuit (4) is made of said capacitors (44) (45) and of m cells (43) defined above in the discussion of the FIGS. 12 and 13, each of these cells being connected between the gates of the transistors (611) (612) of one of said differential pairs;

the damping circuit (9) is made of a resistor (94) connected between a node at a power supply voltage and the gate of the p second transistors (612) of said differential pairs, and of a resistor (95) connected between the reference terminal (ground) and the gate of the p second transistors (612) of said differential pairs;

the receiving circuit (6) consists of all components shown in FIG. 7, except the components already identified as belonging to the termination circuit (4) or to the damping circuit (9).

The receiving circuit (6) is not directly connected to said signal terminals (101) and to said common terminal (100). However, the receiving circuit (6) is coupled to the p signal terminals (101) through capacitors (44) and to said common terminal (100) through a capacitor (45), in such a way that the receiving circuit (6) produces at its outputs p "output signals of the receiving circuit" corresponding each to one of the transmission channels, each of the "output signals of the receiving circuit" being determined by the voltage between one of said signal terminals (101) and said common terminal (100).

The damping circuit (9) is not directly connected to said common terminal (100). However, the damping circuit (9) is coupled to said common terminal (100) through a capacitor (45), in such a way that the damping circuit (9) is, for said common terminal (100), approximately equivalent to a network consisting of a passive two-terminal circuit element having a first terminal connected to said common terminal (100), the passive two-terminal circuit element having a second terminal connected to the first terminal of a voltage source delivering a constant voltage, the second terminal of said voltage source being connected to said reference terminal. Another function of the damping circuit (9) is to provide a suitable biasing to the gate of the transistors (611) (612).

In the above definition of the termination circuit (4), of the damping circuit (9) and of the receiving circuit (6), the capacitors (44) (45) providing an alternating current coupling are defined as being only a part of the termination circuit (4). Consequently, the termination circuit (4), the damping circuit (9) and the receiving circuit (6) are without any part in common to any two of them. However, it is clear that the capacitors (44) connected to said signal terminals (101) are necessary to the operation of the receiving circuit (6) and that the capacitor (45) connected to said common terminal (100) is necessary to the operation of the receiving circuit (6) and of the damping circuit (9). Consequently, it would be possible to consider that the capacitors (44) connected to said signal terminals (101) belong to the receiving circuit (6) and/or that the capacitor (45) connected to said common terminal (100) belongs to the receiving circuit (6) or to the damping circuit (9). It would also be possible to consider that the termination circuit (4), the damping circuit (9) and the receiving circuit (6) are not without any part in common to any two of them.

When the "first control signal of the termination circuit" applied to the cells (43) is low and the "second control signal of the termination circuit" applied to the cells (43) is high, the termination circuit (4) is considered as in the deactivated state.

When the "first control signal of the termination circuit" applied to the cells (43) is high and the "second control signal of the termination circuit" applied to the cells (43) is low, the termination circuit (4) is considered as in the activated state, and the termination circuit (4) is, for said signal terminals (101) and said common terminal (100), approximately equivalent to a network consisting of m=3 passive linear two-terminal circuit elements having each a first terminal connected to one of said signal terminals (101), each passive linear two-terminal circuit element having a second terminal connected to said common terminal (100), these passive linear two-terminal circuit elements being adjustable by electrical means, using the "first control signal of the termination circuit" and/or the "second control signal of the termination circuit".

INDICATIONS ON INDUSTRIAL APPLICATIONS

The interfacing circuit of the invention is suitable for pseudo-differential transmission between integrated circuits through an interconnection having two or more transmission conductors, the transmission presenting reduced unwanted couplings.

We note that, in the embodiments of an interfacing device of the invention, given above by way of non-limiting examples and shown in FIGS. 7 to 14, the active components are MOSFETs. This is not at all a characteristic of the invention, and specialists understand that it would have also been possible to use bipolar transistors or other types of active components. Consequently, the interfacing device of the invention may be implemented in integrated circuits made using any applicable manufacturing process.

The invention is suitable for the protection against the noise produced by unwanted electromagnetic couplings in printed circuit boards. The invention is particularly beneficial to printed circuit boards comprising wide-band analog circuits or fast digital circuits. For receiving p transmission channels, the invention has the advantage of only requiring p+1 pins on an integrated circuit providing the functions of the receiving circuit and the termination circuit, as opposed to 2p pins in the case of a receiver for differential transmission.

The interfacing circuit of the invention is particularly suitable for pseudo-differential transmission inside an integrated circuit, because it provides a good protection against the noise related to the currents flowing in the reference conductor and in the substrate of the integrated circuit.

An interfacing device of the invention may be built inside an integrated circuit, but this is not at all a characteristic of the invention. For instance, it may be interesting that the receiving circuit be built inside an integrated circuit, the termination circuit being built outside this integrated circuit.

The invention is suitable for an implementation in a data bus architecture.

The invention is particularly suitable for multilevel signaling, because this type of transmission scheme is more sensitive to noise than binary signaling.

The invention, in particular when the transmission variables used by said transmitting circuit are currents, is particularly suitable for simultaneous bi-directional signaling, because this type of transmission scheme is more sensitive to noise than unidirectional signaling.

The invention claimed is:

1. A device for transmitting signals through a plurality of transmission channels, in a known frequency band, comprising:
    m signal terminals, a common terminal and a reference terminal, the signal terminals and the common terminal being configured to be connected to an interconnection having at least m+1 conductors, m being an integer greater than or equal to 2;
    a receiving circuit delivering, when the receiving circuit is in the activated state, p output signals of the receiving circuit corresponding each to a transmission channel, p being an integer greater than or equal to 2 and less than or equal to m, the input of the receiving circuit being coupled to at least p of the signal terminals and to the common terminal, each of the output signals of the receiving circuit being mainly determined by the voltage between one of the signal terminals and the common terminal; and
    a termination circuit coupled to each of the signal terminals and to the common terminal, the termination circuit being, when the termination circuit is in the activated state, approximately equivalent, for the signal terminals and the common terminal, to a network consisting of m branches, each of the branches having a first terminal and a second terminal, each of the branches consisting of a passive two-terminal circuit element connected in series with a voltage source delivering a constant voltage, the first terminal of each of the branches being connected to one and only one of the signal terminals, the second terminal of each of the branches being connected to the common terminal, each of the signal terminals being connected to the first terminal of one and only one of the branches.

2. A device for transmitting signals through a plurality of transmission channels, in a known frequency band, comprising:

m signal terminals, a common terminal and a reference terminal, the signal terminals and the common terminal being configured to be connected to an interconnection having at least m+1 conductors, m being an integer greater than or equal to 2;

a receiving circuit delivering, when the receiving circuit is in the activated state, p output signals of the receiving circuit corresponding each to a transmission channel, p being an integer greater than or equal to 2 and less than or equal to m, the input of the receiving circuit being coupled to at least p of the signal terminals and to the common terminal, each of the output signals of the receiving circuit being mainly determined by the voltage between one of the signal terminals and the common terminal; and a termination circuit coupled to each of the signal terminals and to the common terminal, the termination circuit being, when the termination circuit is in the activated state, approximately equivalent, for the signal terminals and the common terminal, to a network consisting of m branches, each of the branches having a first terminal and a second terminal, each of the branches consisting of a passive two-terminal circuit element connected in series with a voltage source delivering a constant voltage, the first terminal of each of the branches being connected to one and only one of the signal terminals, the second terminal of each of the branches being connected to the common terminal, each of the signal terminals being connected to the first terminal of one and only one of the branches, wherein the termination circuit in the activated state is configured such that, at least one quiescent operating point, each of the passive two-terminal circuit elements has a small-signal impedance having, in at least a part of the known frequency band, an absolute value less than or equal to thousand ohms and a real part greater than or equal to three ohms and greater than or equal to one tenth of the absolute value.

3. The device of claim 1, wherein the termination circuit is configured to be in the activated state when the receiving circuit is in the activated state.

4. The device of claim 1, wherein the termination circuit in the activated state is, for the signal terminals and the common terminal, approximately equivalent to a network comprising m passive linear two-terminal circuit elements, each passive linear two-terminal circuit element having a first terminal connected to one and only one of the signal terminals, each passive linear two-terminal circuit element having a second terminal connected to a node having a fixed voltage with respect to the common terminal, each of the signal terminals being connected to the first terminal of one and only one of the passive linear two-terminal circuit elements, and wherein the termination circuit in the activated state is configured such that each of the passive linear two-terminal circuit elements has an impedance having, in at least a part of the known frequency band, an absolute value less than or equal to thousand ohms and a real part greater than or equal to three ohms and greater than or equal to one tenth of said absolute value.

5. The device of claim 4, wherein an impedance matrix, with respect to the common terminal, of the termination circuit in the activated state can be adjusted by electrical means.

6. The device of claim 4, wherein the termination circuit has an activated state and a deactivated state, and wherein an impedance matrix, with respect to the common terminal, of the termination circuit in the activated state is different from an impedance matrix, with respect to the common terminal, of the termination circuit in the deactivated state.

7. The device of claim 4, wherein the termination circuit has an activated state and a deactivated state, and wherein each current flowing from the termination circuit to one of the signal terminals is substantially zero when the termination circuit is in the deactivated state.

8. The device of claim 1, further comprising a transmitting circuit receiving q input signals of the transmitting circuit each corresponding to a transmission channel, q being an integer greater than or equal to 2 and less than or equal to m, the output of the transmitting circuit delivering, when the transmitting circuit is in the activated state, q transmission variables, each transmission variable being either a voltage applied to one of the signal terminals or a current flowing out of one of the signal terminals, each transmission variable being mainly determined by one and only one of the input signals of the transmitting circuit.

9. The device of claim 1, wherein the device constitutes a part of an integrated circuit, the interconnection being realized inside the integrated circuit.

10. The device of claim 1, wherein the device constitutes a part of an integrated circuit, each of the m signal terminals being coupled to one or more pins of the integrated circuit, the common terminal being coupled to one or more pins of the integrated circuit.

11. A device for transmitting signals through a plurality of transmission channels, in a known frequency band, comprising:

m signal terminals, a common terminal and a reference terminal, the signal terminals and the common terminal being configured to be connected to an interconnection having at least m+1 conductors, m being an integer greater than or equal to 2;

a receiving circuit delivering, when the receiving circuit is in the activated state, p output signals of the receiving circuit corresponding each to a transmission channel, p being an integer greater than or equal to 2 and less than or equal to m, the input of the receiving circuit being coupled to at least p of the signal terminals and to the common terminal, each of the output signals of the receiving circuit being mainly determined by the voltage between one of the signal terminals and the common terminal; and a termination circuit coupled to each of the signal terminals and to the common terminal, the termination circuit being, when the termination circuit is in the activated state, approximately equivalent, for the signal terminals and the common terminal, to a network consisting of m branches, each of the branches having a first terminal and a second terminal, each of the branches consisting of a passive two-terminal circuit element connected in series with a voltage source delivering a constant voltage, the first terminal of each of the branches being connected to one and only one of the signal terminals, the second terminal of each of the branches being connected to the common terminal, each of the signal terminals being connected to the first terminal of one and only one of the branches, and a damping circuit coupled to the common terminal, the damping circuit being, for the common terminal, approximately equivalent to a network consisting of a passive two-terminal circuit element and a voltage source delivering a constant voltage, the passive two-terminal circuit element having a first terminal connected to the common terminal, the passive two-terminal circuit element having a second terminal connected to the first terminal of the voltage source, the second terminal of the voltage source being connected to the reference terminal.

12. The device of claim 2, wherein the termination circuit is configured to be in the activated state when the receiving circuit is in the activated state.

13. The device of claim 11, wherein the termination circuit is configured to be in the activated state when the receiving circuit is in the activated state.

14. The device of claim 2, further comprising a transmitting circuit receiving q input signals of the transmitting circuit each corresponding to a transmission channel, q being an integer greater than or equal to 2 and less than or equal to m, the output of the transmitting circuit delivering, when the transmitting circuit is in the activated state, q transmission variables, each transmission variable being either a voltage applied to one of the signal terminals or a current flowing out of one of the signal terminals, each transmission variable being mainly determined by one and only one of the input signals of the transmitting circuit.

15. The device of claim 11, further comprising a transmitting circuit receiving q input signals of the transmitting circuit each corresponding to a transmission channel, q being an integer greater than or equal to 2 and less than or equal to m, the output of the transmitting circuit delivering, when the transmitting circuit is in the activated state, q transmission variables, each transmission variable being either a voltage applied to one of the signal terminals or a current flowing out of one of the signal terminals, each transmission variable being mainly determined by one and only one of the input signals of the transmitting circuit.

16. The device of claim 2, wherein the device constitutes a part of an integrated circuit, the interconnection being realized inside the integrated circuit.

17. The device of claim 11, wherein the device constitutes a part of an integrated circuit, the interconnection being realized inside the integrated circuit.

18. The device of claim 2, wherein the device constitutes a part of an integrated circuit, each of the m signal terminals being coupled to one or more pins of the integrated circuit, the common terminal being coupled to one or more pins of the integrated circuit.

19. The device of claim 11, wherein the device constitutes a part of an integrated circuit, each of the m signal terminals being coupled to one or more pins of the integrated circuit, the common terminal being coupled to one or more pins of the integrated circuit.

* * * * *